United States Patent
Park et al.

(10) Patent No.: US 10,319,984 B2
(45) Date of Patent: Jun. 11, 2019

(54) THREE-DIMENSIONAL ELECTRODE STRUCTURE AND SECONDARY BATTERY INCLUDING THE SAME

(71) Applicant: SAMSUNG ELECTRONICS CO., LTD., Suwon-si, Gyeonggi-do (KR)

(72) Inventors: Hwiyeol Park, Ansan-si (KR); Hojung Yang, Suwon-si (KR); Huisu Jeong, Suwon-si (KR); Kyounghwan Kim, Seoul (KR); Junhyeong Lee, Seoul (KR); Sungjin Lim, Suwon-si (KR); Jin S. Heo, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 45 days.

(21) Appl. No.: 15/489,790

(22) Filed: Apr. 18, 2017

(65) Prior Publication Data
US 2018/0114973 A1    Apr. 26, 2018

(30) Foreign Application Priority Data

Oct. 25, 2016  (KR) .................. 10-2016-0139284

(51) Int. Cl.
*H01M 4/131* (2010.01)
*H01M 4/04* (2006.01)
(Continued)

(52) U.S. Cl.
CPC ......... *H01M 4/131* (2013.01); *H01M 4/0471* (2013.01); *H01M 4/13* (2013.01); *H01M 4/134* (2013.01); *H01M 4/364* (2013.01); *H01M 4/38* (2013.01); *H01M 4/505* (2013.01); *H01M 4/525* (2013.01); *H01M 4/626* (2013.01); *H01M 10/04* (2013.01); *H01M 10/0525* (2013.01); *H01M 10/0436* (2013.01); *H01M 10/052* (2013.01); *H01M 10/0585* (2013.01);
(Continued)

(58) Field of Classification Search
None
See application file for complete search history.

(56) References Cited

U.S. PATENT DOCUMENTS 7,553,584 B2    6/2009  Chiang et al.
8,822,088 B2    9/2014  Tajima et al.
(Continued)

FOREIGN PATENT DOCUMENTS

JP    2003317707 A    11/2003
JP    2015060697 A    3/2015
(Continued)

*Primary Examiner* — Alix E Eggerding
(74) *Attorney, Agent, or Firm* — Cantor Colburn LLP

(57) ABSTRACT

A three-dimensional ("3D") electrode structure includes a current collecting layer, a plurality of plates protruding from the current collecting layer and including an active material, and a base layer provided between the current collecting layer and the plurality of plates. The base layer includes an active material-metal sintered composite. The plurality of plates includes an active material-metal sintered composite. A metal content of the active material-metal sintered composite of the plurality of plates is less than a metal content of the active material-metal sintered composite of the base layer. At least one partition wall supporting the plurality of plates is further provided on the base layer.

22 Claims, 31 Drawing Sheets

(51) Int. Cl.
  *H01M 4/134* (2010.01)
  *H01M 4/36* (2006.01)
  *H01M 4/38* (2006.01)
  *H01M 4/505* (2010.01)
  *H01M 4/525* (2010.01)
  *H01M 10/0525* (2010.01)
  *H01M 4/13* (2010.01)
  *H01M 4/62* (2006.01)
  *H01M 10/04* (2006.01)
  *H01M 4/02* (2006.01)
  *H01M 10/052* (2010.01)
  *H01M 10/0585* (2010.01)

(52) U.S. Cl.
  CPC ............... *H01M 2004/027* (2013.01); *H01M 2004/028* (2013.01); *H01M 2220/30* (2013.01)

(56) References Cited

U.S. PATENT DOCUMENTS

| | | | |
|---|---|---|---|
| 2009/0035664 A1* | 2/2009 | Chiang | H01M 4/0426 429/317 |
| 2013/0017435 A1* | 1/2013 | Sato | H01M 4/505 429/158 |
| 2016/0204464 A1 | 7/2016 | Cho et al. | |

FOREIGN PATENT DOCUMENTS

| KR | 1019990045129 A | 10/1999 |
|---|---|---|
| KR | 1020010037552 A | 5/2001 |
| KR | 1020140063798 A | 5/2014 |
| KR | 1020147009652 A | 5/2014 |
| KR | 1020150002857 A | 7/2016 |
| KR | 1020150007444 A | 7/2016 |
| KR | 20170042935 A | 4/2017 |

\* cited by examiner

< ACTIVE MATERIAL >   < ACTIVE MATERIAL-METAL COMPOSITE >

< ACTIVE MATERIAL-METAL COMPOSITE >

< Washing >

< Sintering >

< Washing >

THREE-DIMENSIONAL ELECTRODE STRUCTURE AND SECONDARY BATTERY INCLUDING THE SAME

CROSS-REFERENCE TO RELATED APPLICATION

This application claims priority to Korean Patent Application No. 10-2016-0139284, filed on Oct. 25, 2016, and all the benefits accruing therefrom under 35 U.S.C. § 119, the content of which in its entirety is herein incorporated by reference.

BACKGROUND

1. Field

Embodiments of the invention relate to electrode structures and batteries including the same.

2. Description of the Related Art

Secondary batteries are capable of charging and discharging unlike primary batteries that are not rechargeable, and have been used for various electronic devices such as mobile phones, laptop computers, or camcorders. In particular, a lithium secondary battery exhibiting a higher voltage and a higher energy density per unit weight than those of a nickel-cadmium battery or a nickel-hydrogen battery has been increasingly used.

As types of electronic devices employing the secondary batteries have been diversified and related markets have grown, demands for improving performance of secondary batteries in terms of, for example, energy density, rate capability, durability, stability, flexibility, etc., have increased. The energy density is related to an increase in a capacity of a secondary battery, and the rate capability is related to an improvement in a charge rate of a secondary battery.

SUMMARY

Provided are electrode structures, e.g., three-dimensional ("3D") electrode structures, capable of enhancing an energy density of secondary batteries.

Provided are electrode structures capable of improving a rate capability of secondary batteries.

Provided are electrode structures which are advantageous in increasing a capacity of secondary batteries and have excellent structural stability.

Provided are electrode structures having improved electrical conductivity.

Provided are secondary batteries including the electrode structures.

Provided are methods of manufacturing the electrode structures and the secondary batteries.

Additional embodiments will be set forth in part in the description which follows and, in part, will be apparent from the description, or may be learned by practice of the presented embodiments.

According to an embodiment, a three-dimensional ("3D") electrode structure includes a current collecting layer, a plurality of plates electrically connected to the current collecting layer, protruding from the current collecting layer, and including an active material, and a base layer provided between the current collecting layer and the plurality of plates, the base layer including an active material-metal sintered composite.

In an embodiment, the active material-metal sintered composite may include at least one metal of Al, Cu, Ni, Co, Cr, W, Mo, Ag, Au, Pt, and Pd.

In an embodiment, a content of metal in the active material-metal sintered composite may be about 1 percent by volume (vol %) to about 30 vol %.

In an embodiment, the active material-metal sintered composite may include a cathode active material.

In an embodiment, the active material-metal sintered composite may include a plurality of active material grains and a plurality of metal grains, and an average size of the plurality of metal grains may be less than an average size of the plurality of active material grains.

In an embodiment, each of the plurality of plates may include an inner current collecting layer inside thereof, and the inner current collecting layer may electrically contact the base layer.

In an embodiment, the plurality of plates may include an active material-metal sintered composite.

In an embodiment, a metal content (vol %) of the active material-metal sintered composite of the plurality of plates may be less than a metal content (vol %) of the active material-metal sintered composite of the base layer.

In an embodiment, a metal content of the active material-metal sintered composite of the plurality of plates may be about 1 vol % to about 20 vol %.

In an embodiment, an electrical conductivity of the active material-metal sintered composite of the base layer may be higher than an electrical conductivity of the active material-metal sintered composite of the plurality of plates.

In an embodiment, the 3D electrode structure may further include at least one partition wall arranged on the base layer perpendicular to the plurality of plates to support the plurality of plates.

In an embodiment, the at least one partition wall may include an active material of a same composition as or a different composition from the plurality of plates.

In an embodiment, the at least one partition wall may include an inner current collecting layer inside thereof, and the inner current collecting layer may electrically contact the base layer.

In an embodiment, the at least one partition wall may include an active material-metal sintered composite.

In an embodiment, a metal content (vol %) of the active material-metal sintered composite of the at least one partition wall may be less than a metal content (vol %) of the active material-metal sintered composite of the base layer.

According to an embodiment of another embodiment, a 3D electrode structure includes a current collecting layer, and a plurality of plates electrically connected to the current collecting layer, arranged perpendicular to the current collecting layer, and including an active material, in which the plurality of plates includes an active material-metal sintered composite.

In an embodiment, the active material-metal sintered composite may include at least one metal of Al, Cu, Ni, Co, Cr, W, Mo, Ag, Au, Pt, and Pd.

In an embodiment, a content of metal in the active material-metal sintered composite may be about 1 vol % to about 20 vol %.

In an embodiment, a base layer may be further provided between the current collecting layer and the plurality of plates, and the base layer may include the active material-metal sintered composite.

In an embodiment, a metal content (vol %) of the active material-metal sintered composite of the plurality of plates may be less than a metal content (vol %) of the active material-metal sintered composite of the base layer.

In an embodiment, an electric conductivity of the active material-metal sintered composite of the base layer may be higher than an electric conductivity of the active material-metal sintered composite of the plurality of plates.

According to another embodiment, a secondary battery includes a first electrode structure, a second electrode structure arranged spaced apart from the first electrode structure, and an electrolyte provided between the first electrode structure and the second electrode structure, in which the first electrode structure includes the above-defined 3D electrode structure.

In an embodiment, the first electrode structure may be a cathode structure and the second electrode structure may be an anode structure.

In an embodiment, the first electrode structure may include a plurality of first plates having a first active material and the second electrode structure may include a plurality of second plates having a second active material, and the plurality of first plates and the plurality of second plates may be alternately arranged.

In an embodiment, the first electrode structure, the electrolyte, and the second electrode structure may constitute a battery cell, and a plurality of battery cells corresponding to the battery cell may be stacked on each other.

BRIEF DESCRIPTION OF THE DRAWINGS

These and/or other embodiments will become apparent and more readily appreciated from the following description of the embodiments, taken in conjunction with the accompanying drawings, in which.

DETAILED DESCRIPTION

Figure 1:
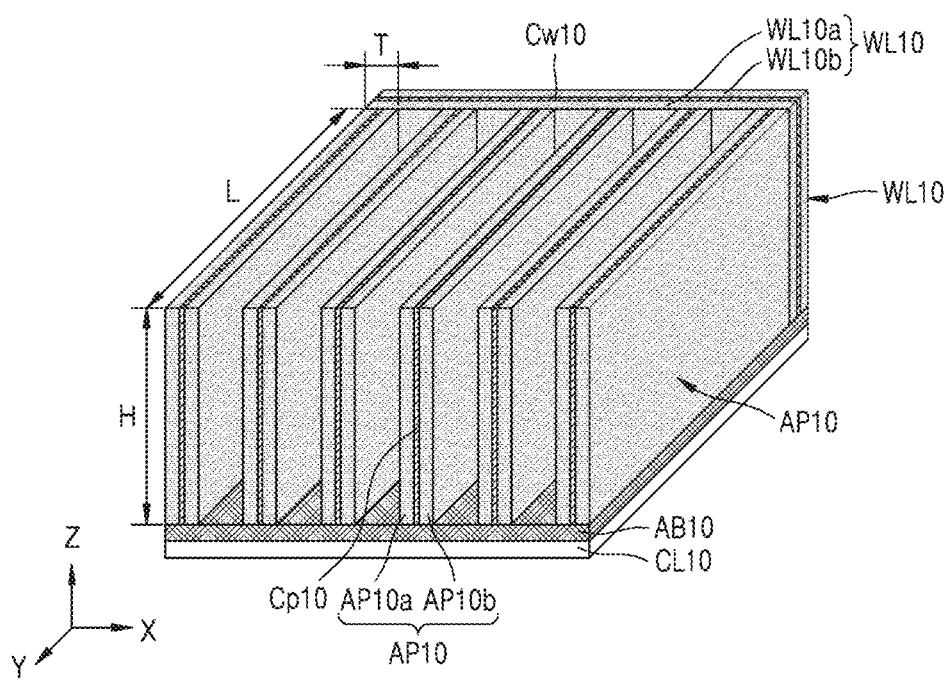
FIG. 1 is a perspective view of an embodiment of a three-dimensional ("3D") electrode structure.

Various embodiments will now be described more fully with reference to the accompanying drawings in which embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of embodiments.

Spatially relative terms, such as "beneath," "below," "lower," "above," "upper" and the like, may be used herein for ease of description to describe one element or feature's relationship to another element(s) or feature(s) as illustrated in the drawings. It will be understood that the spatially relative terms are intended to encompass different orientations of the device in use or operation in addition to the orientation depicted in the drawings. For example, if the device in the drawings is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-sectional illustrations that are schematic illustrations of idealized embodiments (and intermediate structures) of embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region provided by implantation may result in some implantation in the region between the buried region and the surface through which the implantation takes place. Thus, the regions illustrated in the drawings are schematic in nature and their shapes are not intended to illustrate the actual shape of a region of a device and are not intended to limit the scope of embodiments.

Unless otherwise defined, all terms (including technical and scientific terms) used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, three-dimensional ("3D") electrode structures, secondary batteries including the same, and methods of manufacturing the 3D electrode structures and the second batteries according to embodiments are described in detail with reference to the accompanying drawings. In the drawings, the widths and thicknesses of layers and regions are exaggerated for clarity and convenience of explanation. Like reference numerals in the drawings denote like elements.

FIG. 1 is a perspective view of a 3D electrode structure according to an embodiment.

Referring to FIG. 1, a current collecting layer CL10 may be provided. The current collecting layer CL10 may be a first electrode current collector, for example, a cathode current collector. The current collecting layer CL10 may have a plate shape. In this case, the current collecting layer CL10 may be referred to as a current collecting plate.

A plurality of active material plates AP10 may extend perpendicular to the current collecting layer CL10 and electrically connected to the current collecting layer CL10. The active material plates AP10 may be perpendicular to one surface of the current collecting layer CL10. The active material plates AP10 may be spaced apart from each other at a predetermined interval and parallel to each other. The active material plates AP10 may be, for example, a cathode active material plate. An inner current collecting layer (hereinafter, also referred to as the inner current collector) Cp10 may be provided in each of the active material plates AP10. In other words, each of the active material plates AP10 may include the inner current collector Cp10. Each of the active material plates AP10 may be divided into two parts AP10a and AP10b by the inner current collector Cp10. In other words, a first plate part AP10a may be provided at one side (e.g., left side in FIG. 1) of the inner current collector Cp10 and a second plate part AP10b may be provided at the other side (e.g., right side in FIG. 1) of the inner current collector Cp10. A height H, a length L, and a thickness (also referred to as "width") T of each of the active material plates AP10 may be the same as those illustrated in the drawings. A ratio of the height H to the thickness T may be referred to as an aspect ratio AR.

An active material base layer AB10 may be provided between the current collecting layer CL10 and the active material plates AP10. In other words, the active material base layer AB10 may be provided on the current collecting layer CL10, and the active material plates AP10 may be provided on the active material base layer AB10. Accordingly, the active material plates AP10 may be electrically connected to the current collecting layer CL10 via the active material base layer AB10. When the active material plates AP10 include the inner current collector Cp10, the inner current collector Cp10 may electrically contact the active material base layer AB10. The active material base layer AB10 may be, for example, a cathode active material base layer. Although the active material base layer AB10 is referred to as an "active material base layer" because the active material base layer AB10 basically includes an active material, this does not imply that the active material base layer AB10 consists of an active material only. The active material base layer AB10 may further include other materials in addition to an active material. The material composition of the active material base layer AB10 is described later in detail.

Figure 2:
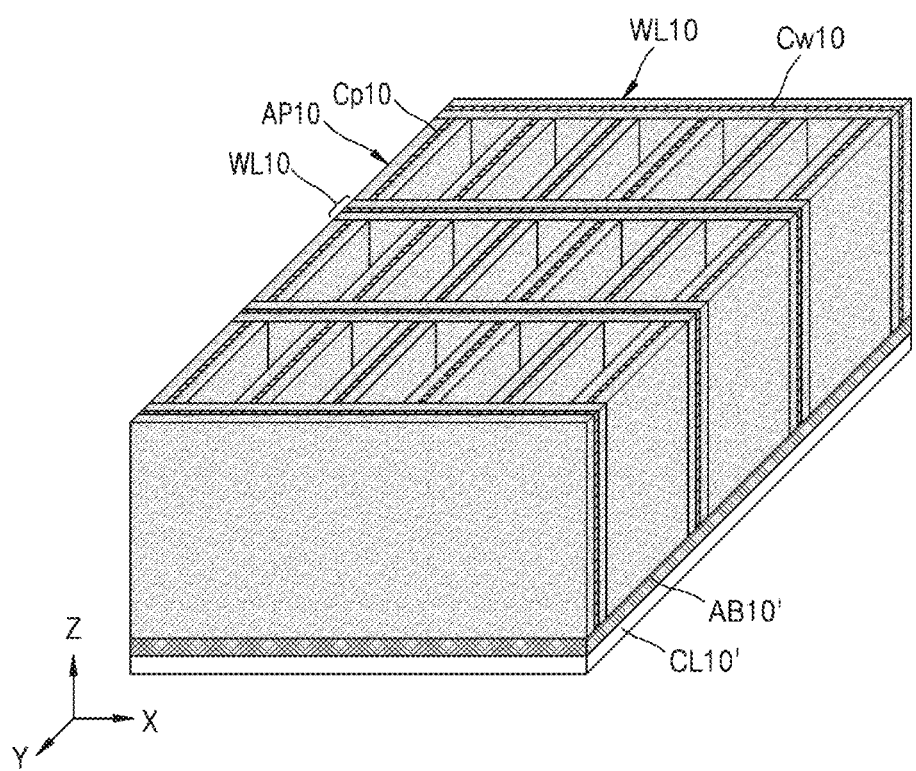
FIG. 2 is a perspective view of an example of an extended structure of FIG. 1.

Additionally, at least one partition wall WL10 for supporting the active material plates AP10 may be further provided on the active material base layer AB10. The partition wall WL10 may be arranged perpendicular to, or substantially perpendicular to, the active material plates AP10. The partition wall WL10 may be a kind of a supporting plate or a supporting layer. The partition wall WL10 may or may not include an inner current collecting layer (hereinafter, also referred to as the partition-wall current collecting layer) Cw10. A case in which the partition wall WL10 includes the partition-wall current collecting layer Cw10 is illustrated in FIGS. 1 and 2, for example. In this case, the partition wall WL10 may be divided into two parts WL10a and WL10b by the partition-wall current collecting layer Cw10. In other words, a first partition wall part WL10a may be provided at one side of the partition-wall current collecting layer Cw10, and a second partition wall part WL10b may be provided at the other side of the partition-wall current collecting layer Cw10. In an embodiment, although it is not illustrated, assuming that the partition wall WL10 is a first partition wall, a second partition wall facing the first partition wall may be further provided, and the active material plates AP10 may be provided between the first partition wall WL10 and the second partition wall opposite to the first partition wall WL10.

Hereinafter, materials and structures of the current collecting layer CL10, the active material base layer AB10, the active material plates AP10, the inner current collector Cp10, the partition wall WL10, and the partition-wall current collecting layer Cw10 are described in detail, In an embodiment, the current collecting layer CL10 may include at least one of conductive materials, for example, Cu, Au, Pt, Ag, Zn, Al, Mg, Ti, Fe, Co, Ni, Ge, In, and Pd. The current collecting layer CL10 may be a metal layer or a layer including a conductive material other than metal.

The active material base layer AB10 may include a sintered composite of an active material and metal. In the following description, the sintered composite is also referred to as an "active material-metal sintered composite". The active material may be a cathode active material. In an embodiment, the cathode active material may include a Li-containing oxide, for example. In an embodiment, the Li-containing oxide may be an oxide including Li and transition metal, for example. In an embodiment, the Li-containing oxide may be, for example, $LiMO_2$, where M denotes metal, for example. In an embodiment, the M may be any one of Co, Ni, and Mn or a combination of two or more thereof, for example. In an embodiment, $LiMO_2$ may be $LiCoO_2$, for example. The cathode active material may include ceramic of a cathode composition, and may be polycrystal or single crystal. However, the detailed materials of the cathode active material presented above are exemplary and other cathode active materials may be used. The metal included in the active material base layer AB10, that is, the metal included in the active material-metal sintered composite, may include at least one of, for example, Al, Cu, Ni, Co, Cr, W, Mo, Ag, Au, Pt, and Pd. In an embodiment, the content of metal in the active material-metal sintered composite may be, for example, about 1 percent by volume (vol %) to about 30 vol %, for example. The active material-metal sintered composite may include a plurality of active material grains and a plurality of metal grains. An average size of the metal grains may be smaller than an average size of the active material grains. The metal grains may be provided at a grain boundary of the active material grains or in the vicinity thereof. In relation that the active material base layer AB10 includes the active material-metal sintered composite, the 3D electrode structure of the illustrated embodiment may be advantageous in securing high energy density and high rate capability, which is described in detail later.

The active material plates AP10 may include the cathode active material. In an embodiment, the active material plates AP10 may include a Li-containing oxide, for example. The Li-containing oxide may be the same as or similar to that described in relation to the active material base layer AB10. The cathode active material may include a ceramic sintered body of a cathode composition, and may be polycrystal or single crystal. However, the detailed materials of the cathode active material presented above are exemplary and may be modified. The inner current collector Cp10 may include a material that is the same as or similar to that of the current collecting layer CL10. In an embodiment, the inner current collector Cp10 may include at least one of conducive materials, for example, Cu, Au, Pt, Ag, Zn, Al, Mg, Ti, Fe, Co, Ni, Ge, In, and Pd.

The partition wall WL10 may include an active material having the same composition as or a different composition from the active material of the active material plates AP10. In other words, the first and second partition wall parts WL10a and WL10b may include an active material having the same composition as or a different composition from the active material plates AP10. The material of the partition-wall current collecting layer Cw10 may be the same as or different from the inner current collector Cp10. In an embodiment, the partition wall WL10 may include a non-active material. In this case, the partition-wall current collecting layer Cw10 may not be provided.

The 3D electrode structure of the illustrated embodiment may be a "3D cathode structure". In this case, the current collecting layer CL10 may be a cathode current collecting layer, the active material base layer AB10 may be a cathode active material base layer, and the active material plates AP10 may be cathode active material plates. When the partition wall WL10 includes an active material, the active material may be a cathode active material.

When an electrode structure is provided in a 3D structure in which the active material plates AP10 are provided on the current collecting layer CL10 perpendicular thereto, or substantially perpendicular thereto, capacity and energy density of the 3D electrode structure may be substantially greater than those of a 2D electrode structure, that is, a planar type structure. Since the 3D electrode structure may secure a higher active material volume fraction and a larger reaction area that those of the planar type electrode structure, energy density and rate capability of a secondary battery may be enhanced.

The active material base layer AB10 may improve structural stability of the 3D electrode structure. When the active material plates AP10 are disposed directly on the current collecting layer CL10, it may be difficult to secure the structural stability due to a difference in a shrinkage rate between the current collecting layer CL10 and the active material plates AP10. However, when the active material base layer AB10 is used, since there is no or substantially little difference in the shrinkage rate between the active material base layer AB10 and the active material plates AP10, the structural stability may be secured.

Furthermore, when the active material base layer AB10 includes an active material-metal sintered composite, the active material base layer AB10 may have a high electrical conductivity. Accordingly, a large number of the active material plates AP10 may be disposed on the active material base layer AB10, and an aspect ratio AR, that is, a ratio of height to thickness, of the active material plates AP10 may be increased. In this regard, the AR of the active material plates AP10 may be equal to or greater than about 10 or equal to or greater than about 15. Furthermore, since the active material base layer AB10 has a high electrical conductivity, the active material base layer AB10 may have a high current density. As such, as the active material plates AP10 have a high AR and the active material base layer AB10 has a high current density, the 3D electrode structure of the embodiment may be advantageous to enhance the energy density and improvement of rate capability of a secondary battery. Additionally, since the electrical conductivity of the active material base layer AB10 is high, it is easy to secure a thickness of a predetermined level or greater of the active material base layer AB10. Accordingly, the structural stability may be further improved.

The partition wall WL10 may support the active material plates AP10, and contribute to cell reaction similarly to the active material plates AP10. Accordingly, the partition wall WL10 may simultaneously improve the structural stability of an electrode structure and increase a reaction area.

The structure of FIG. 1 may be repeatedly arranged in a predetermined direction on an X-Y plane and an example thereof is illustrated in FIG. 2. The structure of FIG. 2 may be a repeated structure of the structure of FIG. 1 in a Y-axis direction, for example.

Referring to FIG. 2, an active material base layer AB10' may be provided on a current collecting layer CL10', and a plurality of partition walls WL10 may be provided on the active material base layer AB10' to be spaced apart from each other in a predetermined direction, for example, the Y-axis direction. A plurality of active material plates AP10 may be provided between the two neighboring partition walls WL10. An inner current collector Cp10 may be provided in each of the active material plates AP10, and a partition-wall current collecting layer Cw10 may be provided in each of the partition walls WL10. The materials and properties of the current collecting layer CL10', the active material base layer AB10', the active material plates AP10, the inner current collector Cp10, the partition wall WL10, and the partition-wall current collecting layer Cw10 may be the same as or similar to those of the current collecting layer CL10, the active material base layer AB10, the active material plates AP10, the inner current collector Cp10, the partition wall WL10, and the partition-wall current collecting layer Cw10 of FIG. 1. The arrangement structure of FIG. 2 is exemplary and may be extended/repeated in any predetermined directions or modified in various ways.

Figure 3:
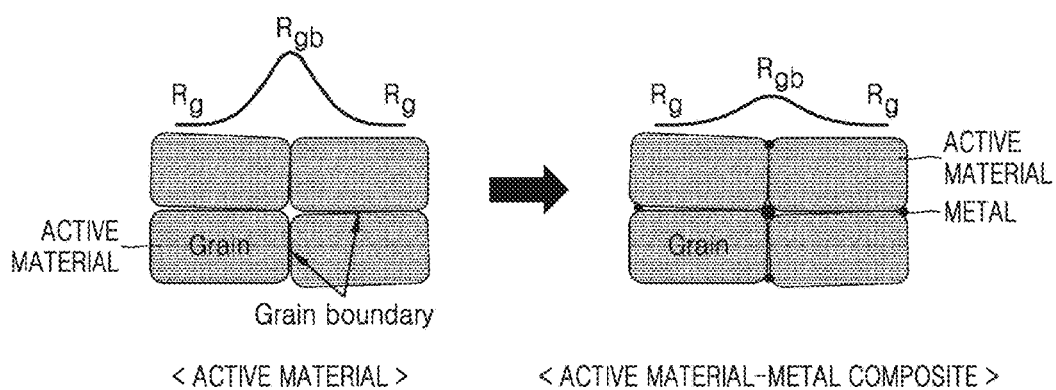
FIG. 3 illustrates structures and properties of an active material sintered body and an active material-metal sintered composite.

FIG. 3 illustrates the structures and properties of an active material sintered body and an active material-metal sintered composite, in which the active material sintered body is illustrated in the left side and the active material-metal sintered composite is illustrated in the right side.

Referring to the left figure of FIG. 3, the active material sintered body may include a plurality of active material grains, and a grain boundary may be provided between the active material grains. Each of the active material grains may be a ceramic sintered body of a cathode composition. Since resistance Rgb is high at the grain boundary, electrical conductivity may be low. The resistance Rgb of the grain boundary may be higher than resistance Rg of the active material grain. Thus, overall resistance of the active material sintered body may be increased.

However, as illustrated in the right figure of FIG. 3, when the active material-metal sintered composite is provided, the resistance Rgb of the grain boundary may be lowered by metal and electrical conductivity may be increased. As a result, the electrical conductivity of the active material-metal sintered composite may be substantially higher than the electrical conductivity of the active material sintered body.

Although, in the right figure of FIG. 3, a plurality of metal grains are disposed on or around the grain boundary of the active material grains and the metal grain maintains a relatively circular (spherical) particle shape, this is exemplary and the shapes or sizes of the active material grain and the metal grains may be modified. In an embodiment, the metal grain may be deformed from a particle shape so as to fill a considerable portion of a grain boundary area between the active material grains, for example, as illustrated in FIG. 4.

Figure 4:
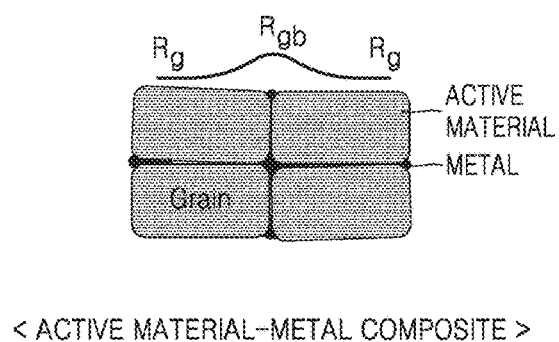
FIG. 4 illustrates another embodiment of a structure and properties of an active material-metal sintered composite.

FIG. 4 illustrates the structure and properties of an active material-metal sintered composite according to another embodiment.

Referring to FIG. 4, the active material-metal sintered composite according to the illustrated embodiment may include a plurality of active material grains and a plurality of metal grain, and may be provided such that the metal grains fill a considerable portion of a grain boundary area between the active material grains. In this case, the resistance Rgb at the grain boundary may be further lowered. Accordingly, the electrical conductivity of the active material-metal sintered composite may be further increased. A fine structure of the active material-metal sintered composite may be modified in various ways according to a type of metal, a type of active material, and a sintering condition.

Additionally, in the embodiments described with reference to FIGS. 1 to 4, the active material base layers AB10 and AB10' may further include a glass material in addition to the active material and the metal. When the glass material is included, a bonding force between the active material and the metal may be enhanced. Accordingly, when the glass material is included, mechanical strength of the active material base layers AB10 and AB10' may be enhanced. In an embodiment, the glass material may include, for example, a glass frit material, and the glass frit material may include at least one of, for example, $BiO_x$, $SiO_x$, $CuO_x$, $PbO_x$, $ZnO_x$, and $B_xO_y$. In an embodiment, in the active material base layers AB10 and AB10', a content of the glass material may be equal to or less than about 5 vol %, for example.

Figure 5:
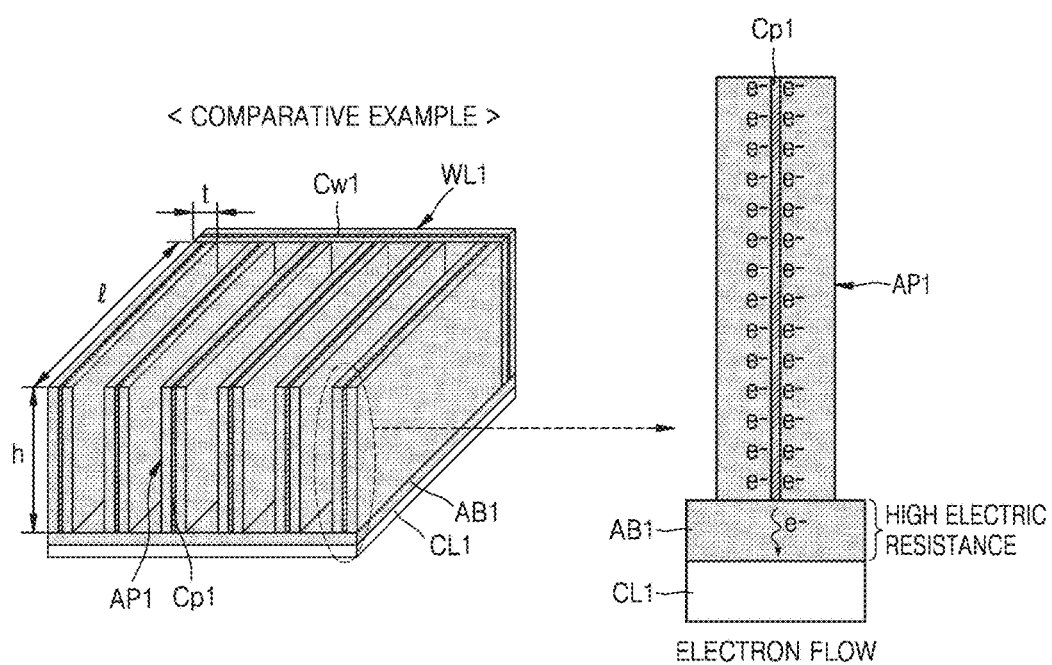
FIG. 5 illustrates a comparative example of an electrode structure and a problem thereof.

FIG. 5 illustrates an electrode structure according to a comparative example and a problem thereof. FIG. 5 includes a perspective view of an electrode structure according to a comparative example and an enlarged cross-sectional view of a part thereof.

Referring to FIG. 5, the electrode structure according to a comparative example may include an active material base layer AB1 provided between a current collecting layer CL1 and a plurality of active material plates AP1. A partition wall WL1 supporting the active material plates AP1 may be provided on the active material base layer AB1. An inner current collector Cp1 may be provided in each of the active material plates AP1, and a partition-wall current collecting layer Cw1 may be provided in the partition wall WL1.

In the electrode structure according to a comparative example, the active material base layer AB1 may include the active material sintered body (the left side figure of FIG. 3), not the active material-metal sintered composite. In other words, the active material base layer AB1 may not include metal and may be mostly formed of an active material. In this case, the electrical conductivity of the active material base layer AB1 may be low and thus it may be difficult to increase the height h of the active material plates AP1.

Accordingly, it may be difficult to implement the active material plates AP1 having a high AR. As a result, the enhancement of the energy density may be limited. Furthermore, when charges (e.g., electrons) e- are moved from the inner current collector Cp1 to the current collecting layer CL1 via the active material base layer AB1, since the electrical conductivity of the active material base layer AB1 is low, the movement of the charges e- through the active material base layer AB1 is not smooth or fast, it may be difficult to increase the current density. Accordingly, it may be difficult to secure superior rate capability. In addition, since the electrical conductivity of the active material base layer AB1 is low, it is difficult to increase the thickness of the active material base layer AB1 and accordingly it may be difficult to secure the structural stability.

Figure 6:
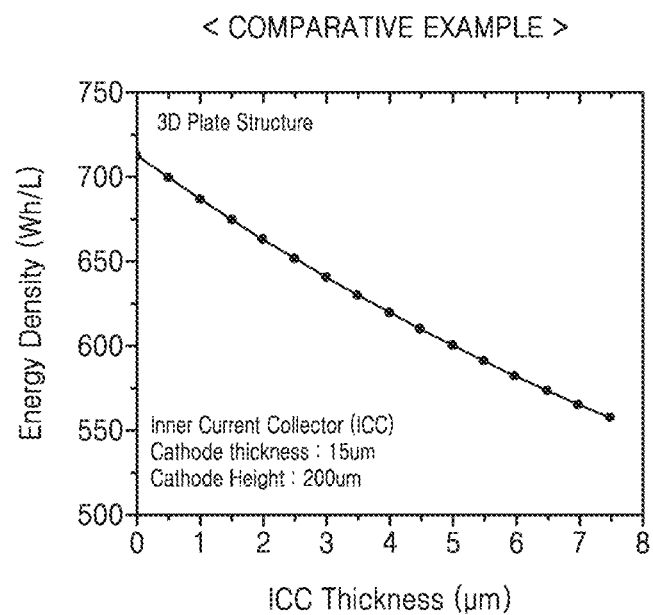
FIG. 6 is a graph for explaining a problem of a comparative example of an electrode structure, showing a change in energy density according to a thickness of an inner current collector.

FIG. 6 is a graph for explaining a problem of the electrode structure according to a comparative example, that is, the structure of FIG. 5, showing a change in energy density in terms of watt-hour per liter (Wh/L) according to the thickness of an inner current collector ICC in terms of micrometer (pm), that is, the inner current collector Cp1 of FIG. 5. The energy density of FIG. 6 is the energy density of a secondary battery including the electrode structure according to the comparative example.

Referring to FIG. 6, as the thickness of the inner current collector ICC (i.e., Cp1 of FIG. 5) provided in each of the active material plates (i.e., AP1 of FIG. 5) increases, the energy density may decrease. In other words, as the thickness of the inner current collector ICC, not the active material, increases, the energy density may decrease.

Figure 7:
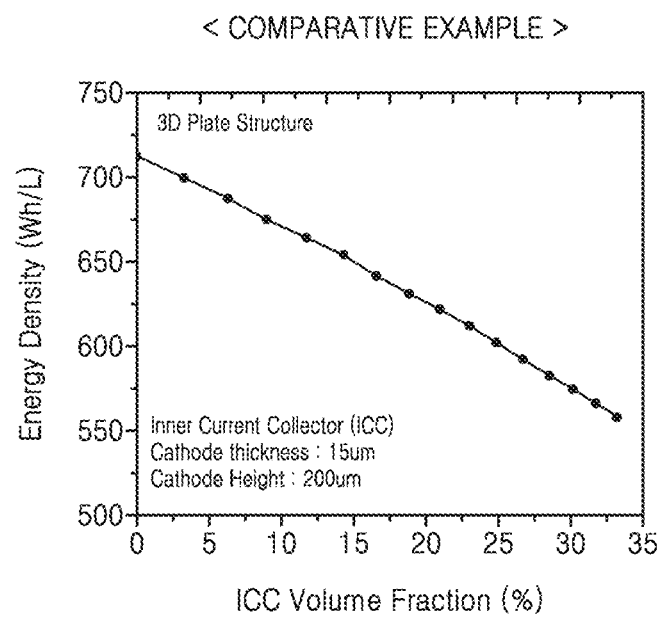
FIG. 7 is a graph for explaining a problem of a comparative example of an electrode structure, showing a change in energy density according to a volume fraction of an inner current collector in a plurality of active material plates.

FIG. 7 is a graph for explaining a problem of the electrode structure according to a comparative example (i.e., the structure of FIG. 5), showing a change in energy density in terms of Wh/L according to a volume fraction of the inner current collector ICC (i.e., Cp1 of FIG. 5) in the active material plates (i.e., AP1 of FIG. 5) in terms of %. The energy density of FIG. 7 is the energy density of secondary battery including the electrode structure according to the comparative example.

Referring to FIG. 7, as the volume fraction of the inner current collector ICC (i.e., Cp1 of FIG. 5) increases, the energy density may decrease. As the volume occupied by the inner current collector ICC, not the active material, increases, the energy density may decrease.

According to the results of FIGS. 6 and 7, it may be advantageous to reduce the thickness and volume fraction of the inner current collector ICC (i.e., Cp1 of FIG. 5) for the improvement of energy density. However, when the thickness and volume fraction of the inner current collector Cp1 is lowered, another problem may be generated, which is described below with reference to FIG. 8.

Figure 8:
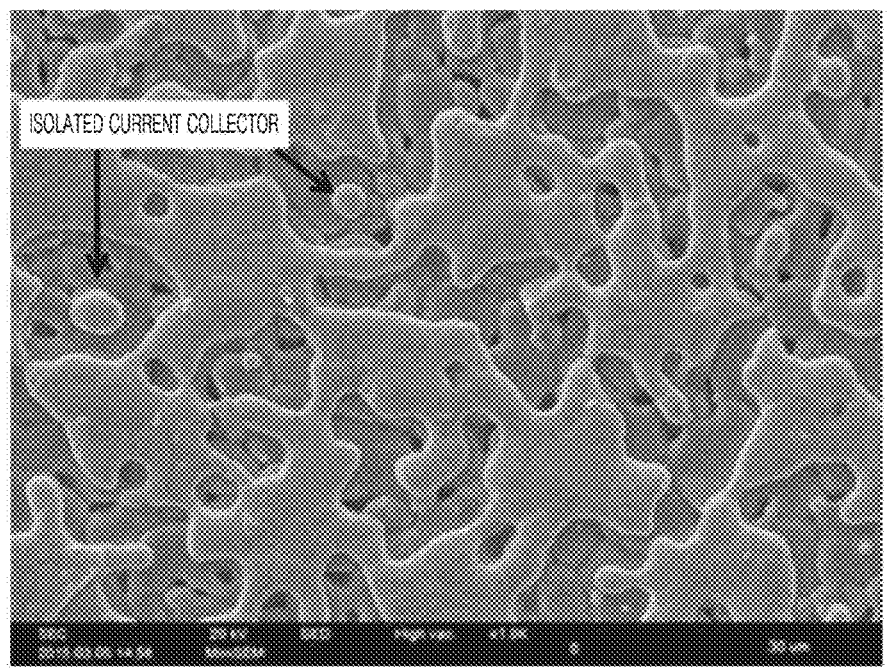
FIG. 8 is a scanning electron microscope ("SEM") image showing a surface state of an inner current collector for explaining a problem of a comparative example of an electrode structure.

FIG. 8 is a scanning electron microscope ("SEM") image showing a surface state of the inner current collector (i.e., Cp1 of FIG. 5) to explain a problem of the electrode structure according to a comparative example (i.e., the structure of FIG. 5).

Referring to FIG. 8, when the inner current collector is provided to have a thickness of about 2 micrometers (μm), a surface of the inner current collector after heat treatment shows that the inner current collector does not form a continuous layer shape and includes an isolated portion. When the thickness of the inner current collector is thin, the isolated portion may be generated in the inner current collector and thus the inner current collector may not perform its own function. To prevent such a problem, when the thickness of the inner current collector is increased, as described in FIGS. 6 and 7, the energy density may decrease.

In this regard, the structures of the active material plates AP1 and the inner current collector Cp1 of FIG. 5 (comparative example) may be modified/improved.

Figure 9:
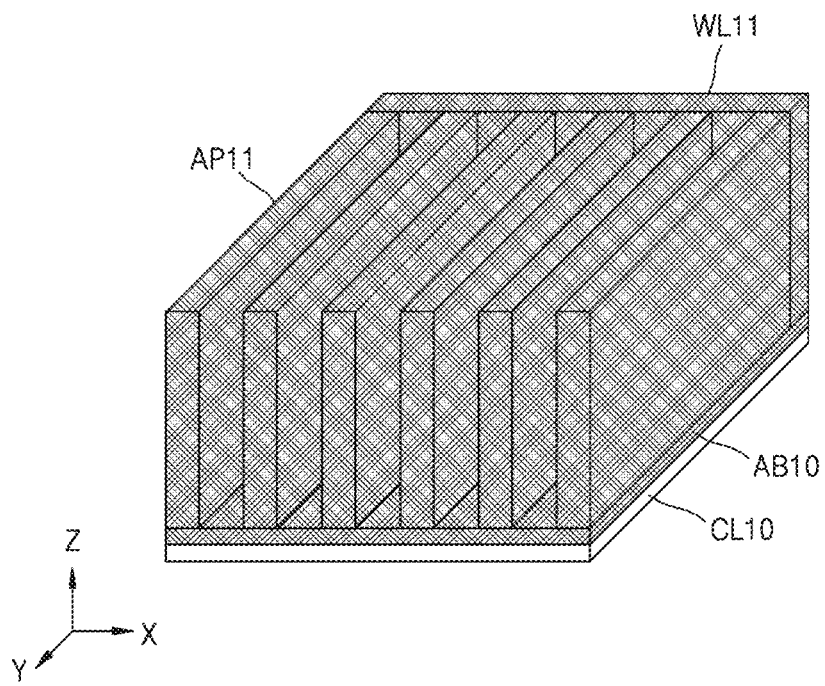
FIG. 9 is a perspective view of another embodiment of a 3D electrode structure.

FIG. 9 is a perspective view of a 3D electrode structure according to another embodiment.

Referring to FIG. 9, the active material base layer AB10 may be provided on the current collecting layer CL10, and a plurality of active material plates AP11 may be provided on the active material base layer AB10. Furthermore, at least one partition wall WL11 supporting the active material plates AP11 may be provided on the active material base layer AB10. Although the active material plates AP11 are also referred to as the "active material plates" because the active material plates AP11 include an active material, this does not mean that the active material plates AP11 consist of an active material only. The active material plates AP11 may further include other materials such as metal in addition to the active material. This may be the same as the above description on the active material base layer AB10 of FIGS. 1 and 2.

In the illustrated embodiment, the active material plates AP11 may include a sintered composite of an active material and metal. The sintered composite may be also referred to as the "active material-metal sintered composite". The active material may be a cathode active material. In an embodiment, the cathode active material may include a Li-containing oxide, and the Li-containing oxide may be $LiMO_2$, where M denotes metal, for example. In an embodiment, the M may be any one of Co, Ni, and Mn, or a combination thereof, for example. The cathode active material may include ceramic of a cathode composition, and may be polycrystal or single crystal. A detailed material of the cathode active material presented herein is exemplary and other cathode active materials may be used therefor. In an embodiment, the metal included in the active material plates AP11, that is, the metal included in the active material-metal sintered composite may include at least one of, for example, Al, Cu, Ni, Co, Cr, W, Mo, Ag, Au, Pt, and Pd. In an embodiment, the content of the metal in the active material-metal sintered composite of the active material plates AP11 may be, for example, about 1 vol % to about 20 vol %. The active material-metal sintered composite may include a plurality of active material grains and a plurality of metal grains. An average size of the metal grains may be less than an average size of the active material grains. The metal grains may be provided on or around a grain boundary of the active material grains.

When the active material plates AP11 include the active material-metal sintered composite, and the active material base layer AB10 includes the active material-metal sintered composite, the metal content (vol %) of the active material-metal sintered composite of the active material plates AP11 may be less than the metal content (vol %) of the active material-metal sintered composite of the active material base layer AB10. Accordingly, the volume fraction of metal in the active material plates AP11 may be less than the volume fraction of metal in the active material base layer AB10. In other words, the volume fraction of the active material in the active material plates AP11 may be greater than the volume fraction of the active material in the active material base layer AB10. The active material plates AP11 exhibiting superior electrical conductivity properties may be advantageous to the enhancement of energy density. Since the electrical conductivity properties may be improved by the metal included in the active material plates AP11 and the active material volume fraction of the active material plates AP11 is relatively large, the energy density may be enhanced. The electrical conductivity of the active material-metal sintered composite of the active material base layer AB10 may be higher than the electrical conductivity of the active material-metal sintered composite of the active material plates AP11. Using the active material base layer AB10, superior electrical conductivity properties may be obtained with respect to the active material plates AP11 and the height of the active material plates AP11 may be easily increased. In this regard, the energy density and rate capability may be enhanced. Furthermore, since the thickness of the active material base layer AB10 may be increased, the structural stability may be secured. Although, in the aforementioned description, the metal content of the active material plates AP11 is less than the metal content of the active material base layer AB10 and the electrical conductivity of the active material base layer AB10 is higher than the electrical conductivity of the active material plates AP11, this is exemplary and may be modified. In an embodiment, the metal content of the active material plates AP11 may be the same as or similar to the metal content of the active material base layer AB10. The electrical conductivity of the active material base layer AB10 may be the same as or similar to the electrical conductivity of the active material plates AP11.

The partition wall WL11 may include a material that is the same as or similar to that of the active material plates AP11. Accordingly, the partition wall WL11 may include the active material-metal sintered composite. The active material-metal sintered composite of the partition wall WL11 may be the same as or similar to the above-described active material-metal sintered composite of the active material plates AP11. Accordingly, the metal content (vol %) of the active material-metal sintered composite of the partition wall WL11 may be less than the metal content (vol %) of the active material-metal sintered composite of the active material base layer AB10. Furthermore, the electrical conductivity of the active material-metal sintered composite of the active material base layer AB10 may be higher than the electrical conductivity of the active material-metal sintered composite of the partition wall WL11. The partition wall WL11 may support the active material plates AP11, and may also contribute to the cell reaction, for example, cathode reaction, similarly to the active material plates AP11.

Additionally, in the embodiment described with reference to FIG. 9, at least one of the active material base layer AB10, the active material plates AP11, and the partition wall WL11 may further include a glass material in addition to the active material and the metal. When the glass material is included, a bonding force between the active material and the metal may be improved. In an embodiment, the glass material may include, for example, a glass frit material, and the glass frit material may include at least one of, for example, BiOx, SiOx, CuOx, PbOx, ZnOx, and BxOy. In an embodiment, in at least one of the active material base layer AB10, the active material plates AP11, and the partition wall WL11, the content of the glass material may be equal to or less than about 5 vol %, for example.

Figure 10:
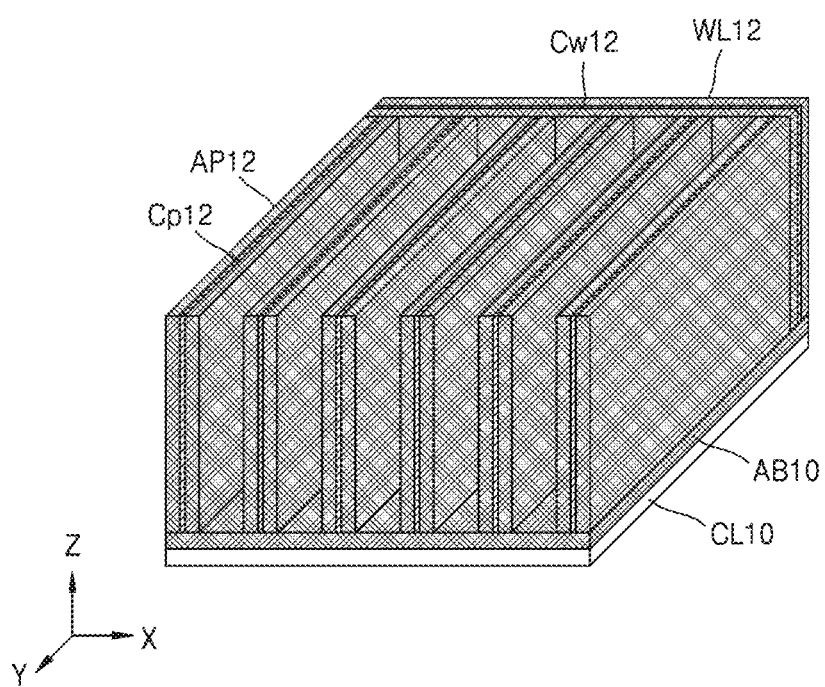
FIG. 10 is a perspective view of another embodiment of a 3D electrode structure.

According another embodiment, the inner current collector may be further provided in each of the active material plates AP11 of FIG. 9, and the partition-wall current collecting layer may be further provided in the partition wall WL11, as illustrated in FIG. 10.

Referring to FIG. 10, an inner current collector Cp12 may be further be provided in an active material plate AP12 including the active material-metal sintered composite. Furthermore, a partition-wall current collecting layer Cw12 may be further provided in a partition wall WL12 including active material-metal sintered composite. The inner current collector Cp12 and the partition-wall current collecting layer Cw12 may be the same as or similar to the inner current collector Cp10 and the partition-wall current collecting layer Cw10 described in FIG. 1, respectively. The active material-metal sintered composite of the active material plate AP12 may be the same as or similar to the active material-metal sintered composite of the active material plates AP11 of FIG. 9. The active material-metal sintered composite of the partition wall WL12 may be the same as or similar to the active material-metal sintered composite of the partition wall WL11 of FIG. 9.

Figure 11:
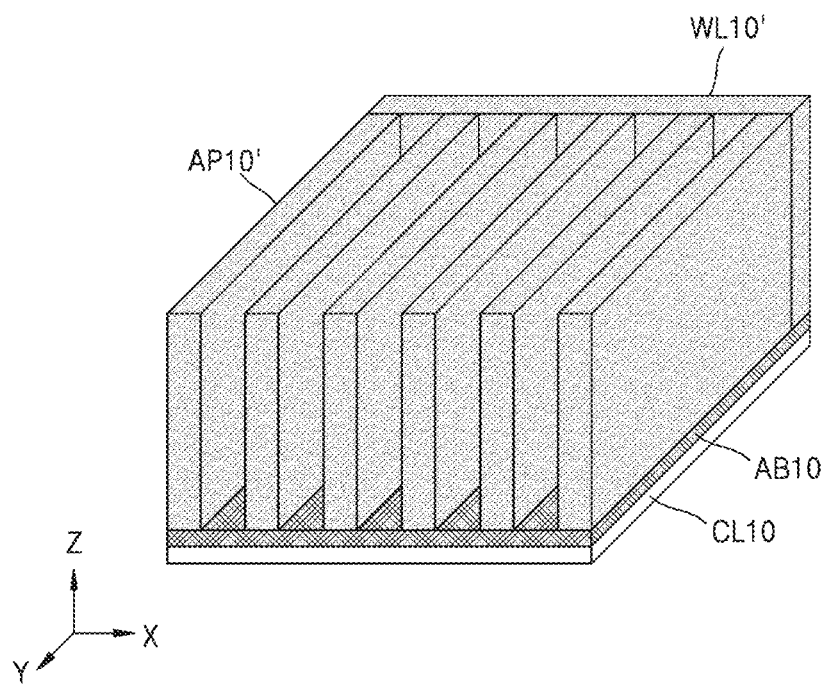
FIG. 11 is a perspective view of another embodiment of a 3D electrode structure.

According another embodiment, in the structure of FIG. 1, the inner current collector Cp10 may not be used in each of the active material plates AP10, and the partition-wall current collecting layer Cw10 may not be used in each of the partition walls WL10, as illustrated in FIG. 11.

Referring to FIG. 11, an active material plate AP10' may not include the inner current collector, and a partition wall WL10' may not include the inner current collector, that is, the partition-wall current collecting layer. The active material plate AP10' may mainly include the cathode active material without including metal. The material of the active material plate AP10' may be the same as or similar to that of the first and second plate parts AP10a and AP10b of FIG. 1. The partition wall WL10' may mainly include the cathode active material without including metal. In this case, the active material of the partition wall WL10' may be the same composition as or a different composition from the active material of the active material plate AP10'.

Figure 12:
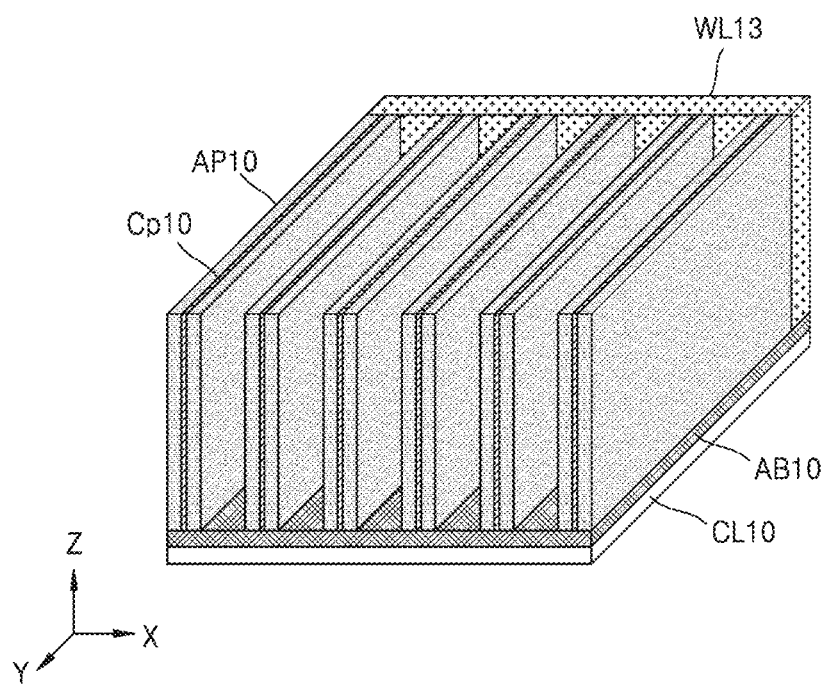
FIG. 12 is a perspective view of another embodiment of a 3D electrode structure.
Figure 13:
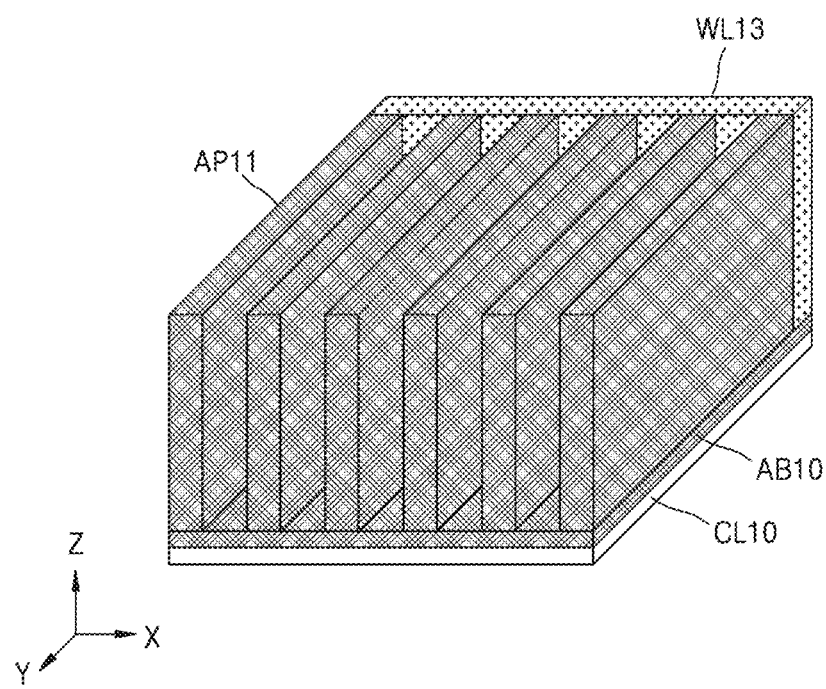
FIG. 13 is a perspective view of another embodiment of a 3D electrode structure.

According another embodiment, in the structures of FIGS. 1, 9, 10, and 11, the partition walls WL10, WL10', WL11, and WL12 may include a non-active material, as illustrated in FIGS. 12 and 13.

FIG. 12 is a perspective view of a 3D electrode structure according to another embodiment, in which a non-active material partition wall WL13 is applied to the structure of FIG. 1. FIG. 13 is a perspective view of a 3D electrode structure according to another embodiment, in which the non-active material partition wall WL13 is applied to the structure of FIG. 9. In FIG. 12, the structure other than the non-active material partition wall WL13 is the same as the structure of FIG. 1, and in FIG. 13, the structure other than the non-active material partition wall WL13 is the same as the structure of FIG. 9. When the non-active material partition wall WL13 including a non-active material is used, the partition-wall current collecting layer may not be used. Furthermore, when the non-active material partition wall WL13 includes the non-active material, the kinds of materials applicable to the non-active material partition wall WL13 may be various. Accordingly, an appropriate material may be applied to the non-active material partition wall WL13 considering the enhancement of structural strength and ease of manufacture.

Secondary batteries having superior performance may be implemented by applying the 3D electrode structures according to the above-described various embodiments. In the following description, secondary batteries employing the 3D electrode structures are described.

Figure 14:
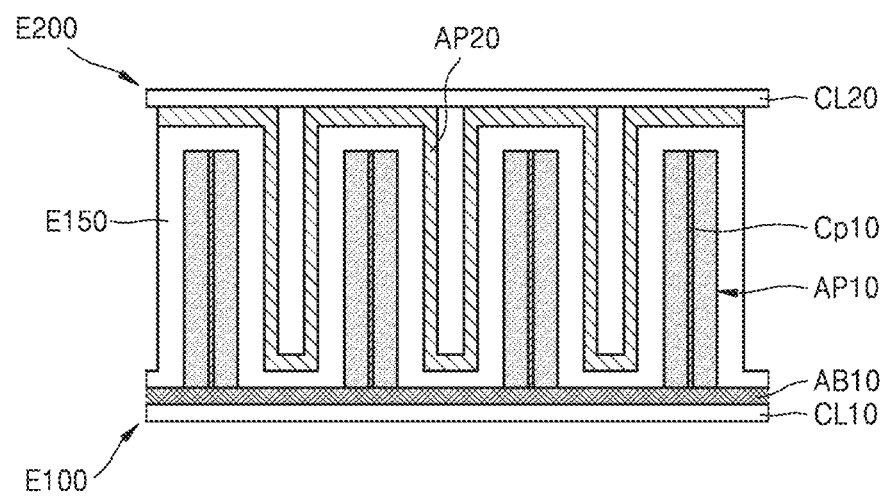
FIG. 14 is a cross-sectional view of an embodiment of a secondary battery including a 3D electrode structure.

FIG. 14 is a cross-sectional view of a secondary battery including a 3D electrode structure according to an embodiment.

Referring to FIG. 14, a first electrode structure E100 may be provided, and a second electrode structure E200 may be provided spaced apart from the first electrode structure E100. An electrolyte layer E150 may be provided between the first electrode structure E100 and the second electrode structure E200.

The first electrode structure E100 may correspond to the 3D electrode structures described with reference to FIGS. 1 to 4 and FIGS. 9 to 13. In an embodiment, the first electrode structure E100 may include a first current collecting layer CL10, a first active material base layer AB10, and a plurality of first active material plates AP10, for example. A first inner current collector Cp10 may be provided in each of the first active material plates AP10. The first current collecting layer CL10, the first active material base layer AB10, the first active material plates AP10, and the first inner current collector Cp10 may correspond to the current collecting layer CL10, the active material base layer AB10, the active material plates AP10, and the inner current collector Cp10 of FIG. 1, respectively. The first electrode structure E100 may be a cathode structure. In this case, the first current collecting layer CL10, the first active material base layer AB10, and the first active material plates AP10 may be a cathode current collecting layer, a cathode active material base layer, and cathode active material plates, respectively.

The electrolyte layer E150 covering the first active material plates AP10 may be provided on the first active material base layer AB10. The electrolyte layer E150 may have a winding (e.g., meandering) shape corresponding to the shape of the first active material plates AP10. The electrolyte layer E150 may include a solid electrolyte. In an embodiment, the electrolyte layer E150 may include a solid electrolyte such as $Li_3PO_4$, $Li_3PO_{4-x}N_x$, $LiBO_{2-x}N_x$, $Li_3PO_4N_x$, $LiBO_2N_x$, $Li_4SiO_4$—$Li_3PO_4$, or $Li_4SiO_4$—$Li_3VO_4$, for example. In an embodiment, the electrolyte layer E150 may include a polymer electrolyte. However, the electrolyte layer E150 is not limited thereto, and the material and shape of the electrolyte layer E150 may be modified in various ways.

The second electrode structure E200 may include a second current collecting layer CL20. The second current collecting layer CL20 may be arranged facing the first current collecting layer CL10. The second electrode structure E200 may further include a second active material member AP20 electrically connected to the second current collecting layer CL20. The second active material member AP20 may have a structure of electrically contacting the second current collecting layer CL20 and extending between the first active material plates AP10. In the second active material member AP20, a portion extending between the first active material plates AP10 may have a plate shape. Accordingly, the portion of the second active material member AP20 extending between the first active material plates AP10 may be also referred to as "a plurality of second active material plates". In this case, the first active material plates AP10 and the second active material plates may be alternately arranged. The electrolyte layer E150 may be provided between the first active material plates AP10 and the second active material member AP20. The second electrode structure E200 may be an anode structure. In this case, the second current collecting layer CL20 may be an anode current collecting layer, and the second active material member AP20 may include an anode active material. In an embodiment, the anode active material may include, for example, Li metal, a carbon-based material, a silicon-based material, or an oxide. In an embodiment, the anode current collecting layer may include at least one of conductive materials, for example, Cu, Au, Pt, Ag, Zn, Al, Mg, Ti, Fe, Co, Ni, Ge, In, and Pd. However, the detailed materials of the anode active material and the anode current collecting layer are exemplary and may be modified. Furthermore, although in FIG. 14 four first active material plates AP10 are illustrated, this is exemplary and the number of the first active material plates AP10 may be modified.

Figure 15:
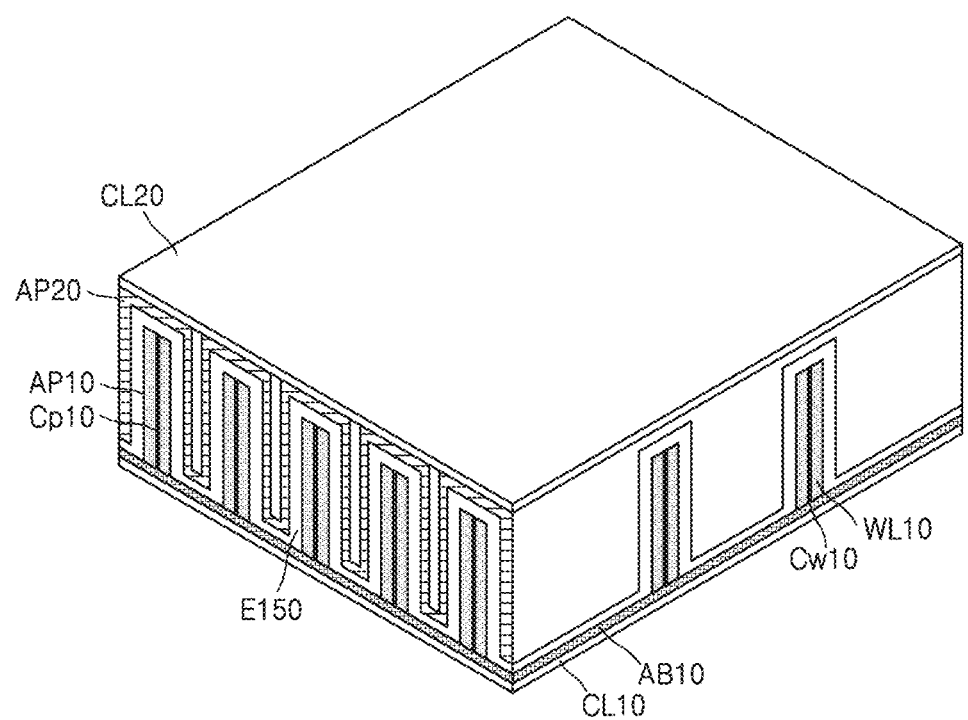
FIG. 15 is a perspective view of an example of the secondary battery corresponding to FIG. 14.

FIG. 15 is a perspective view of the secondary battery of FIG. 14, for example.

Referring to FIG. 15, the partition wall WL10 supporting the first active material plates AP10 may be provided on the active material base layer AB10. A current collecting layer, that is, the partition-wall current collecting layer Cw10, may be further provided in the partition wall WL10. The materials of the partition wall WL10 and the partition-wall current collecting layer Cw10 may be the same as or similar to the materials of the partition wall WL10 and the partition-wall current collecting layer Cw10 of FIG. 1. The other structures may be the same as those described in FIG. 14.

Figure 16:
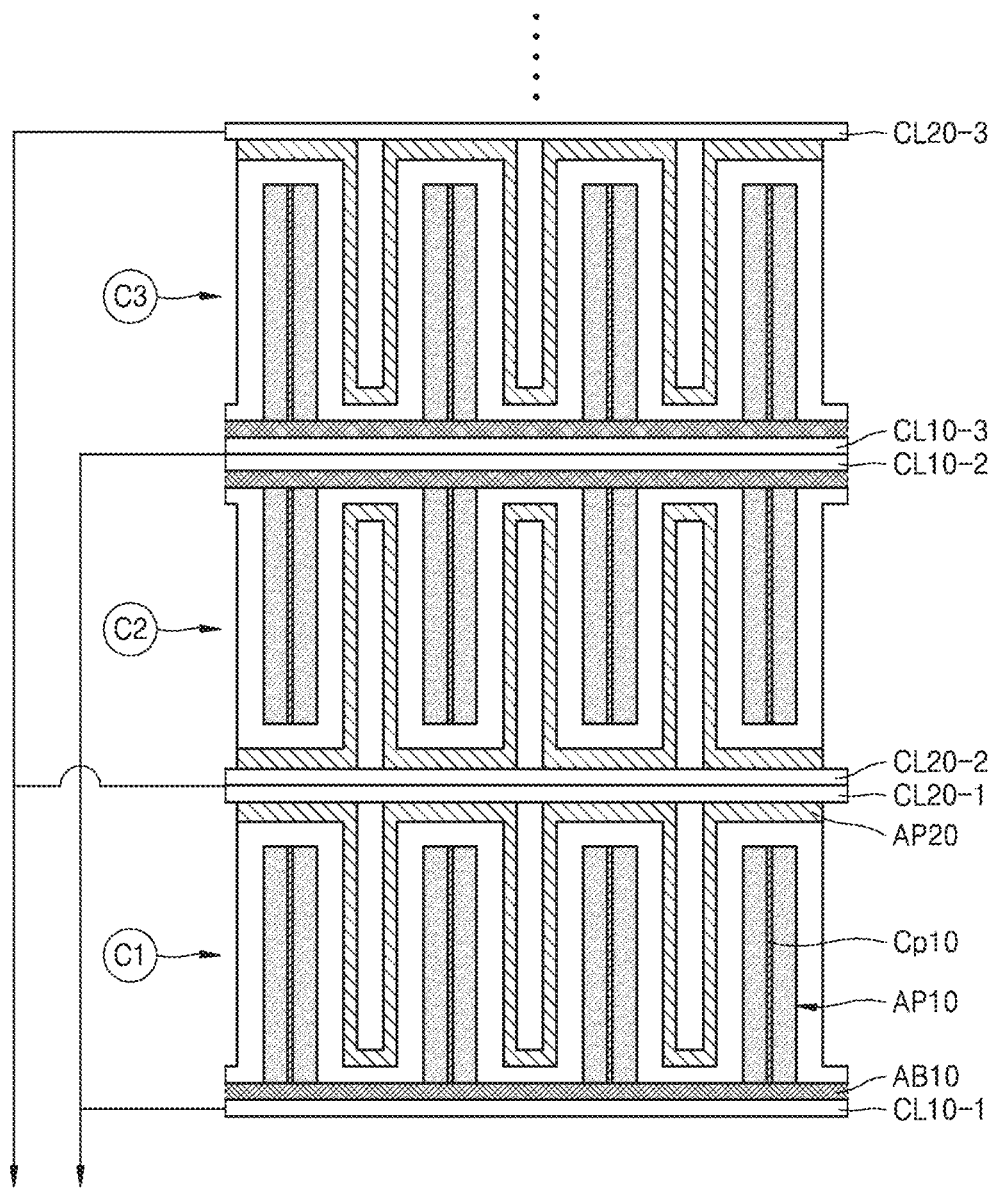
FIG. 16 is a cross-sectional view of another embodiment of a stacked secondary battery including a 3D electrode structure.
Figure 17:
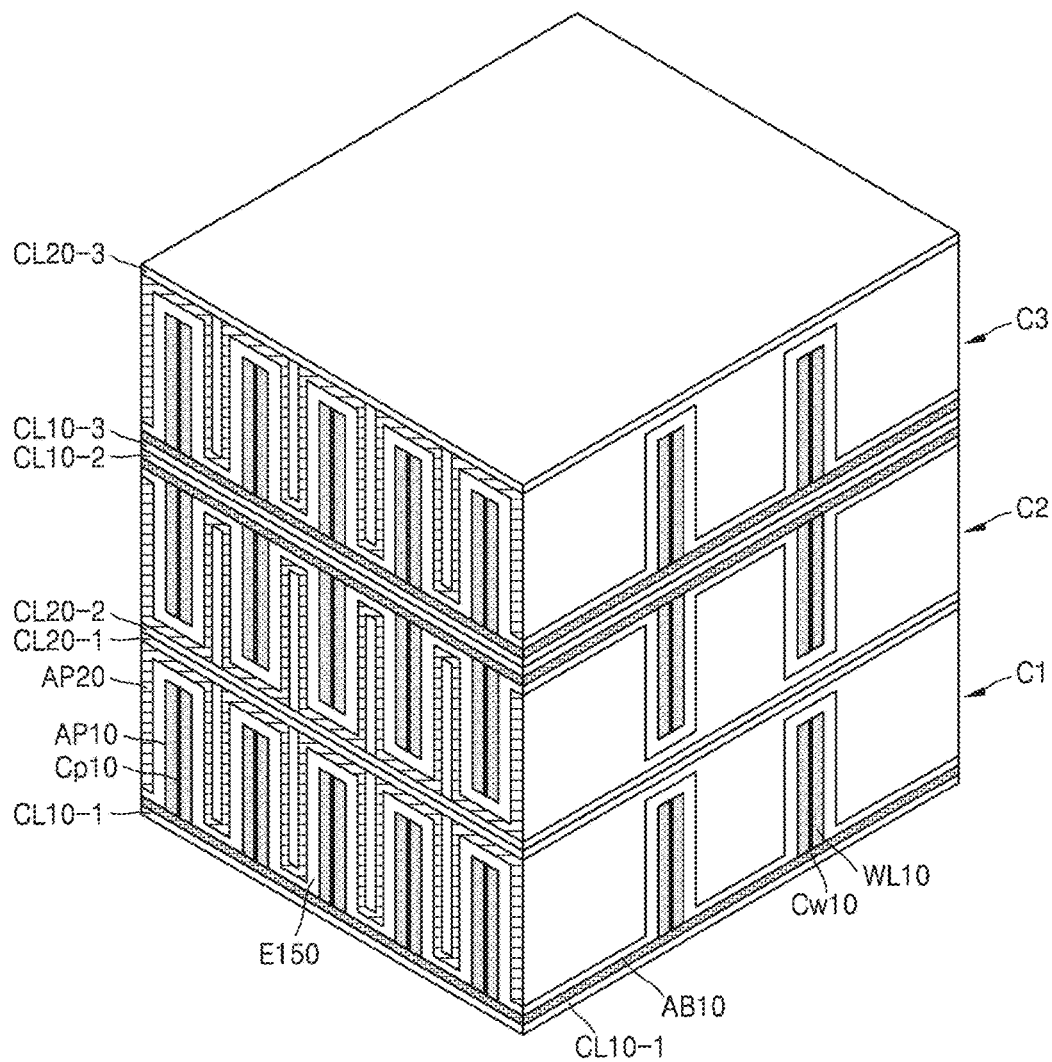
FIG. 17 is a perspective view of an example of the secondary battery corresponding to FIG. 16.

The structure of the secondary battery described with reference to FIGS. 14 and 15 may be a single battery cell or a unit cell, and a stacked secondary battery may be provided by stacking a plurality of battery cells, as illustrated in FIGS. 16 and 17.

FIG. 16 is a cross-sectional view of a stacked secondary battery including a 3D electrode structure, according to another embodiment. FIG. 17 is a perspective view of an example of the stacked secondary battery of FIG. 16.

Referring to FIGS. 16 and 17, a stacked secondary battery may be provided by stacking a plurality of battery cells C1, C2, and C3 which are equivalent to the battery cells described with reference to FIGS. 14 and 15. Although in the description the battery cells C1, C2, and C3 include the first battery cell C1, the second battery cell C2, and the third battery cell C3, the number of battery cells may be modified. The first battery cell C1 may have the same structure as the structure illustrated in FIG. 14. The second battery cell C2 may have a structure that is the same as the structure of FIG. 14, but is upside down, that is, an inverted structure. The third battery cell C3 may have the same structure as the structure of FIG. 14. Accordingly, the battery cells C1, C2, and C3 may be stacked such that current collectors of a same polarity contact each other. In other words, assuming that a cathode current collecting layer and an anode current collecting layer of the first battery cell C1 are respectively a first cathode current collecting layer CL10-1 and a first anode current collecting layer CL20-1, and a cathode current collecting layer and an anode current collecting layer of the second battery cell C2 are respectively a second cathode current collecting layer CL10-2 and a second anode current collecting layer CL20-2, the first anode current collecting layer CL20-1 and the second anode current collecting layer CL20-2 may be arranged to contact or face each other. Furthermore, assuming that a cathode current collecting layer and an anode current collecting layer of the third battery cell C3 are respectively a third cathode current collecting layer CL10-3 and a third anode current collecting layer CL20-3, the second cathode current collecting layer CL10-2 and the third cathode current collecting layer CL10-3 may be arranged to contact or face each other. Accordingly, the odd-numbered battery cells C1 and C3 and the even-numbered battery cell C2 may have inverted structures with respect to each other. The cathode current collecting layers CL10-1, CL10-2, and CL10-3 may be electrically connected to one another, and the anode current collecting layers CL20-1, CL20-2, and CL20-3 may be electrically connected to one another. In an embodiment, the two current collecting layers contacting each other, for example, CL20-1 and CL20-2, may be provided as a single unitary layer, for example. As such, when a stacked secondary battery is provided by stacking the battery cells C1, C2, and C3, a battery capacity per unit area may be increased much.

Although FIGS. 16 and 17 illustrates a case of stacking a plurality of battery cells by changing directions (e.g., vertical direction), according to another embodiment, the battery cells may be stacked without changing directions (e.g., vertical direction). In other words, a plurality of battery cells having the structures and direction equivalent to those of the battery cells of FIG. 14 may be stacked in one direction. In this case, an insulating layer may be provided between two neighboring battery cells to prevent current collecting layers of opposite polarities from contacting each other.

Although in the structures of FIGS. 14 to 17 the first electrode structure E100 has the 3D electrode structure of FIG. 1, the first electrode structure E100 may have various structures as described above with reference to FIGS. 9 to 13. Furthermore, the detailed structures of the second electrode structure E200 illustrated and described in FIGS. 14 to 17 are exemplary and may be modified in various ways. A modified structure of the second electrode structure E200 is described with reference to FIGS. 18 and 19.

Figure 18:
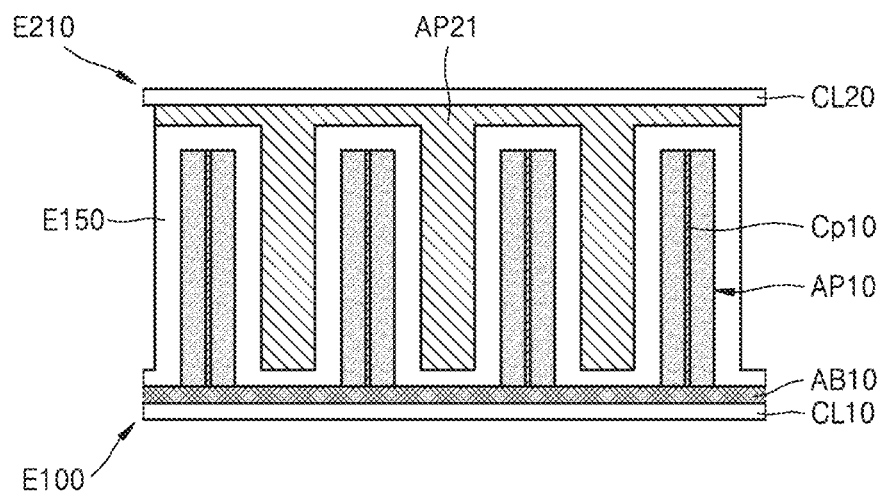
FIG. 18 is a cross-sectional view of another embodiment of a secondary battery including a 3D electrode structure.

In FIG. 18, a second electrode structure E210 may include a second current collecting layer CL20 and a second active material member AP21 electrically connected to the second current collecting layer CL20. The second active material member AP21 may include a portion contacting the second current collecting layer CL20 and having a flat plate shape, and portions extending from the portion and having a plate shape filling a space between the first active material plates AP10. While in the structure of FIG. 14 the second active material member AP20 partially, not fully, fills the space between the first active material plates AP10, in the structure of FIG. 18, the second active material member AP21 may fully, or mostly, fill the space between the first active material plates AP10.

Figure 19:
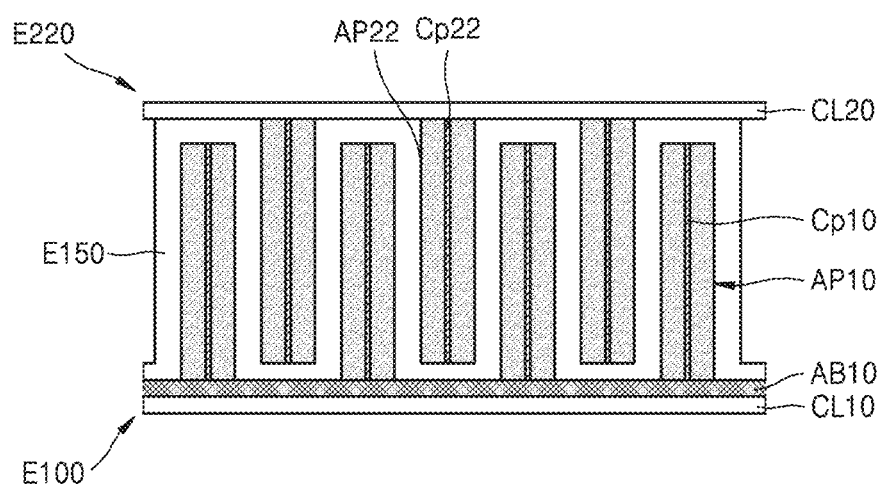
FIG. 19 is a cross-sectional view of another embodiment of a secondary battery including a 3D electrode structure.

In FIG. 19, a second electrode structure E220 may include a second current collecting layer CL20 and a plurality of second active material plates AP22 electrically connected to the second current collecting layer CL20. The second active material plates AP22 may be "anode active material plates". Each of the second active material plates AP22 may further include a second inner current collector Cp22. The second inner current collector Cp22 may electrically contact the second current collecting layer CL20. In an embodiment, the second inner current collector Cp22 may include a conductor such as metal. Although not illustrated, in an embodiment, a predetermined second base layer may be further provided between the second current collecting layer CL20 and the second active material plates AP22. The second base layer may include a second active material, for example, an anode active material, and may further include other material.

The other structures of FIGS. 18 and 19, except for the second electrode structures E210 and E220, may be the same as or similar to those described in FIGS. 14 and 15.

FIGS. 20A to 20M illustrate a method of manufacturing a 3D electrode structure according to an embodiment.

Figure 20A:
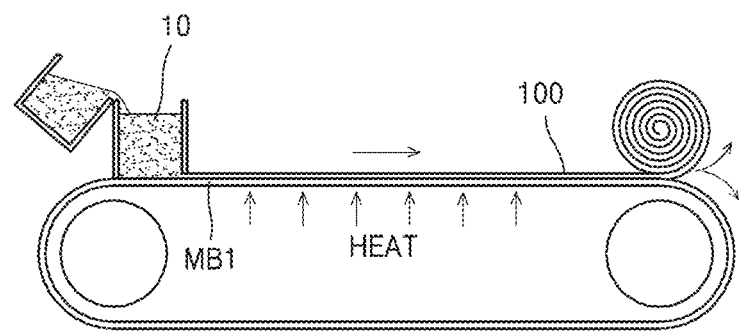
FIGS. 20A to 20M illustrate an embodiment of a method of manufacturing a 3D electrode structure.

Referring to FIG. 20A, after an active material slurry 10 is manufactured, an active material sheet 100 may be provided from the active material slurry 10. In an embodiment, the active material sheet 100 may be provided from the active material slurry 10 using a tape-casting method, for example.

The active material slurry 10 may be manufactured by mixing, for example, an active material ingredient (powder), a binder, a dispersing agent, and a plasticizer with a solvent. In this state, a grinder or a mixing apparatus such as a ball mill may be used. In an embodiment, the active material ingredient may be a cathode active material, and the cathode active material may include a Li-containing oxide, for example. In an embodiment, the Li-containing oxide may be an oxide including Li and transition metal, for example. In an embodiment, the Li-containing oxide may be, for example, $LiMO_2$, where M denotes metal. In an embodiment, the M may be any one of Co, Ni, and Mn, or a combination thereof. In an embodiment, the $LiMO_2$ may be $LiCoO_2$, for example. However, a detailed material of the cathode active material presented herein is exemplary and other cathode active materials may be used therefor.

The active material slurry 10 may be processed in a sheet shape using a shaping apparatus such as a tape-casting apparatus. In this case, the active material slurry 10 may be coated on a moving belt MB1 to a uniform thickness using a doctor blade (not shown). As the active material slurry 10 coated on the moving belt MB1 is dried, that is, the solvent is evaporated, the active material sheet 100 may be provided.

Figure 20B:
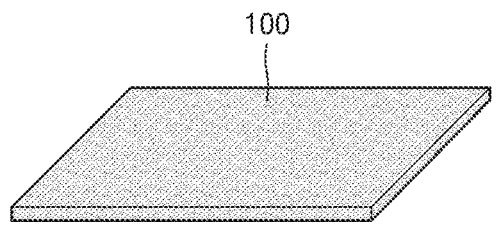

FIG. 20B illustrates the active material sheet 100 provided by the method of FIG. 20A. In an embodiment, the active material sheet 100 may have a thickness of, for example, about 1 μm to about 100 μm, but the active material sheet 100 is not limited thereto.

Figure 20C:
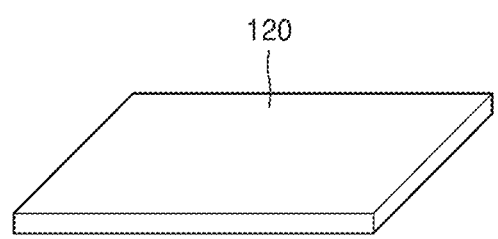

Using a method similar to the method described in FIGS. 20A and 20B, a sacrificial layer sheet 120 as illustrated in FIG. 20C may be provided from sacrificial layer slurry. The sacrificial layer slurry may be manufactured by mixing a sacrificial layer material, a binder, a dispersing agent, and a plasticizer with a solvent. In an embodiment, the sacrificial layer material may be, for example, a carbon-based material such as graphite. In an alternative embodiment, Li-containing oxide, Li-containing carbonate, or Li-containing chloride may be used as the sacrificial layer material. In an embodiment, the Li-containing oxide may include, for example, $Li_2CoSiO_4$, the Li-containing carbonate may include, for example, $Li_2CO_3$, and the Li-containing chloride may include, for example, LiCl. However, the sacrificial layer material is not limited to the above description and other various materials may be used therefor.

Although the sacrificial layer sheet 120 of FIG. 20C may have a thickness of, for example, about 1 μm to about 100 μm, the sacrificial layer sheet 120 is not limited thereto.

Figure 20D:
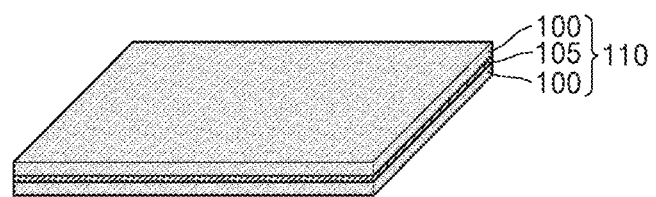

Referring to FIG. 20D, an inner current collecting layer 105 may be provided by coating or printing inner current collector paste or slurry on a surface of the active material sheet 100. In an embodiment, the inner current collecting layer 105 may be deposited by a physical vapor deposition ("PVD") method such as a sputtering or evaporation method. Next, another active material sheet 100 may be separately stacked on the inner current collecting layer 105. The two active material sheets 100 and the inner current collecting layer 105 provided between the two active material sheets 100 may form a single unit structure 110.

Figure 20E:
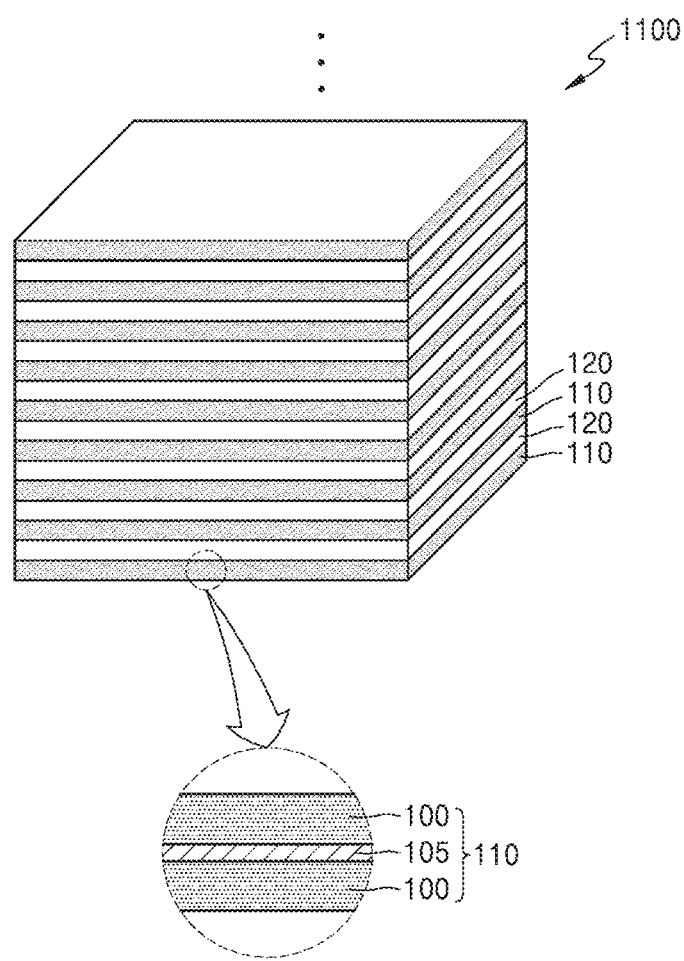

Referring to FIG. 20E, a first stacked structure 1100 may be provided by sequentially stacking the active material sheet 100, the inner current collecting layer 105, the active material sheet 100, and the sacrificial layer sheet 120 in order. When the two active material sheets 100 and the inner current collecting layer 105 provided between the two active material sheets 100 form the unit structure 110, a plurality of unit structures 110 may be stacked with the sacrificial layer sheet 120 interposed therebetween. The first stacked structure 1100 may be pressed with a predetermined pressure at a predetermined temperature. In an embodiment, a pressing process may be performed at around a glass transition temperature Tg of a binder material included in the active material sheet 100 in a direction parallel to a stacking direction, for example. In an embodiment, the pressing process may be performed at a temperature of about 80 degrees Celsius (° C.) to about 100° C. with a pressure of about 3,000 pounds per square inch (psi) to about 10,000 psi, for example. In an embodiment, the pressing process may be, for example, a warm isostatic pressing ("WIP") process.

Figure 20F:
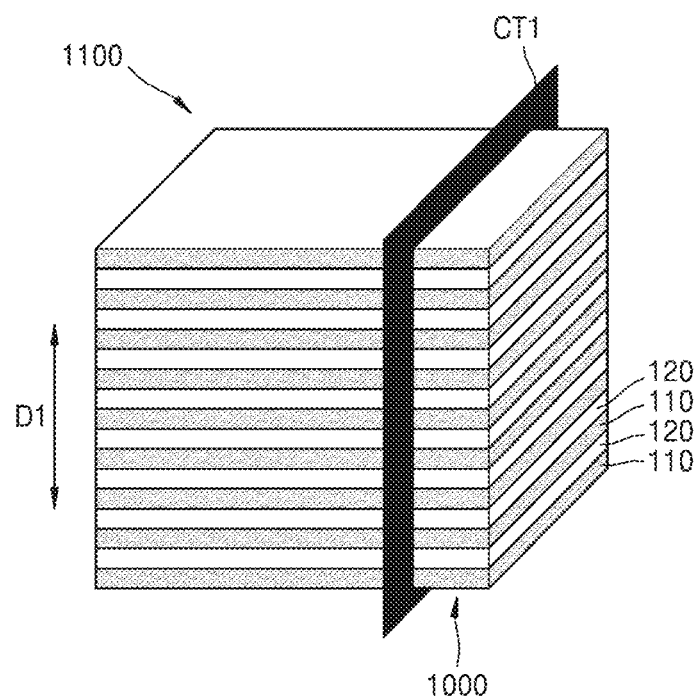

Referring to FIG. 20F, the first stacked structure 1100 may be divided into a plurality of divided first stacked structures 1000 of a desired size (e.g., thickness) using a predetermined cutting member CT1. Although FIG. 20F illustrates one of the divided first stacked structures 1000, a plurality of the divided first stacked structures 1000 may be obtained by repeating the cutting process. This may be a dicing process on the first stacked structure 1100. The cutting process may be performed in a direction parallel to the stacking direction, that is, in a first direction D1. In an embodiment, a blade cutter or wire saw may be used as the cutting member CT1, for example.

Figure 20G:
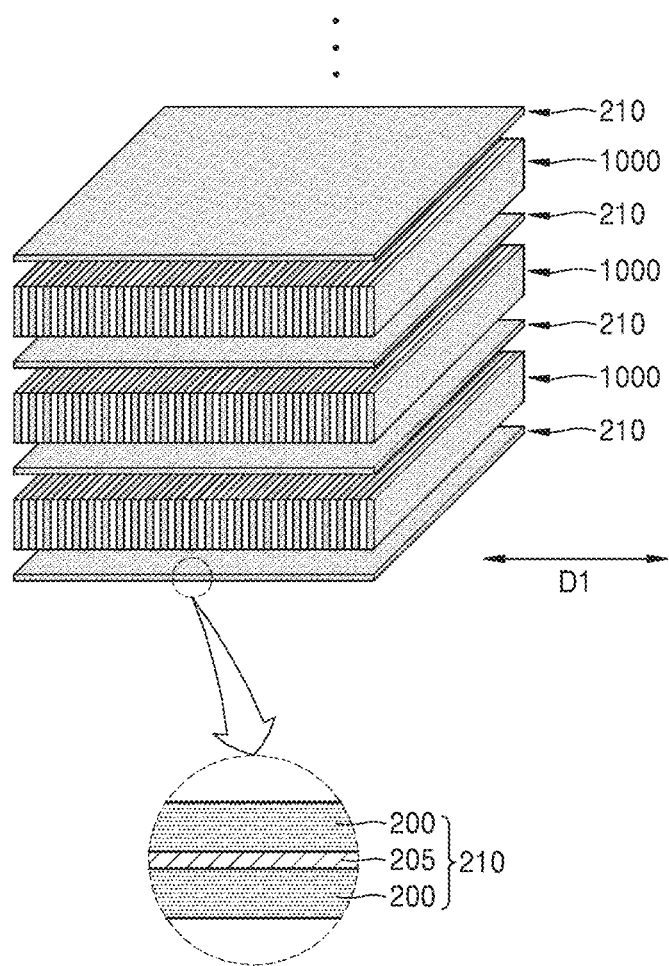

Referring to FIG. 20G, the divided first stacked structures 1000 and a plurality of partition wall layers 210 may be alternately stacked on each other. In a state in which the divided first stacked structures 1000 extend parallel to the first direction D1, a stacking process may be performed in a direction perpendicular to the first direction D1. The partition wall layer 210 may include a partition wall sheet 200. The partition wall sheet 200 may be provided from partition wall slurry, and a formation method thereof may be similar to the method of forming the active material sheet 100 in FIGS. 20A and 20B. The partition wall sheet 200 may include a material that is the same as or similar to that of the active material sheet 100. The partition wall layer 210 may have a stack structure in which an inner current collecting layer 205 is provided between the two partition wall sheets 200. The structure of the partition wall layer 210 may be similar to the unit structure 110 described in FIG. 20D.

Figure 20H:
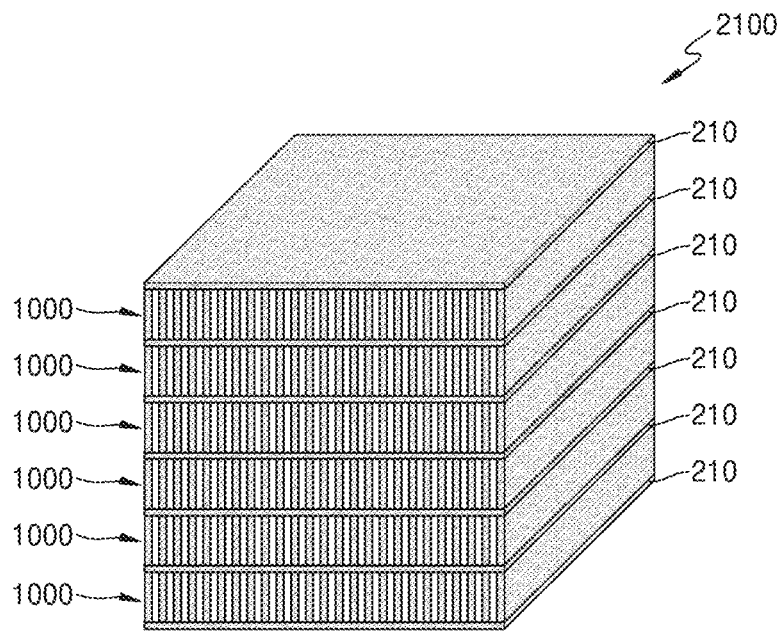

FIG. 20H illustrates a second stacked structure 2100 provided through the stacking process of FIG. 20G. The second stacked structure 2100 may be pressed at a predetermined temperature with a predetermined pressure. In an embodiment, a pressing process may be performed at around the glass transition temperature Tg of a binder material included in the partition wall sheet 200 in a direction parallel to the stacking direction (the stacking direction of FIG. 20G), for example. In an embodiment, the pressing process may be, for example, the WIP process.

Figure 20I:
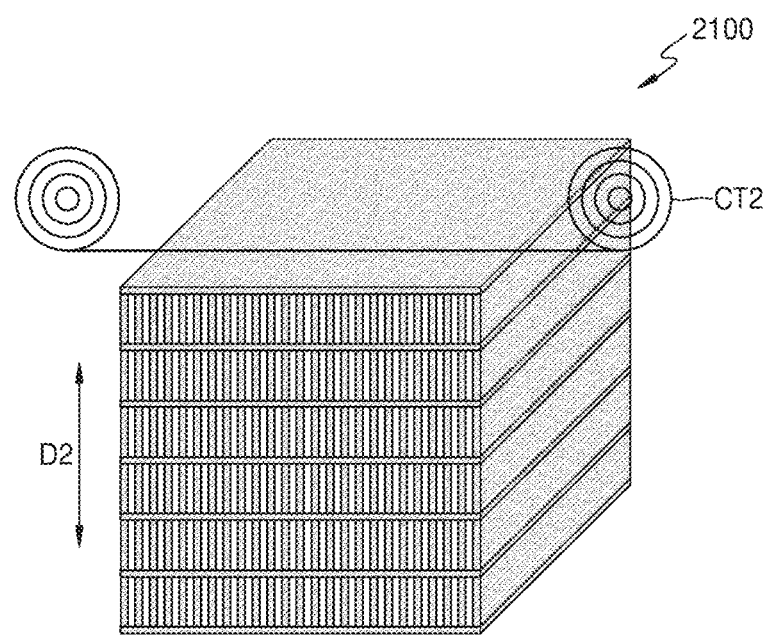

Referring to FIG. 20I, the second stacked structure 2100 may be divided into a plurality of divided second stacked structures (2000 of FIG. 20J) of a desired size (e.g., thickness) using a predetermined cutting member CT2. This may be a dicing process on the second stacked structure 2100. The cutting process may be performed in a direction parallel to the stacking direction of FIG. 20G, that is, in a second direction D2. In an embodiment, a blade cutter or wire saw may be used as the cutting member CT2, for example.

Figure 20J:
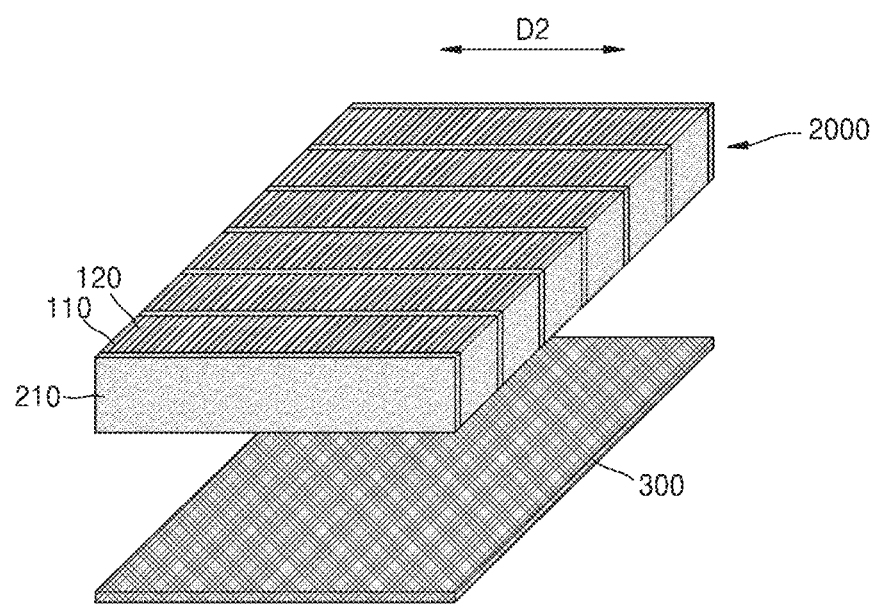

Referring to FIG. 20J, an active material-metal composition layer 300 may be disposed on a surface of the divided second stacked structure 2000. In a state where the divided second stacked structure 2000 extends parallel to the second direction D2 (e.g., horizontal direction in FIG. 20J), the active material-metal composition layer 300 may be attached to the divided second stacked structure 2000 in a direction (e.g., vertical direction in FIG. 20J) perpendicular to the second direction D2. The active material-metal composition layer 300 may be provided by attaching a tape-casted active material-metal composite sheet to the divided second stacked structure 2000 by the WIP process, or by directly printing or coating active material-metal composite paste on a surface of the divided second stacked structure 2000. The active material-metal composite slurry or paste may be manufactured by appropriately mixing an active material ingredient, a metal material, a dispersing agent, a binder, a plasticizer, and a solvent, and the active material-metal composition layer 300 may be provided from the active material-metal composite slurry or paste. In an embodiment, a glass material may be further included in the active material-metal composite slurry or paste. When the glass material is included, a bonding force between the active material and the metal may be improved. In an embodiment, the glass material may include, for example, glass frit, and the glass frit may include at least one of, for example, BiOx, SiOx, CuOx, PbOx, ZnOx, and BxOy. Accordingly, the active material-metal composition layer 300 may further include the glass material in addition to the active material and the metal.

Figure 20K:
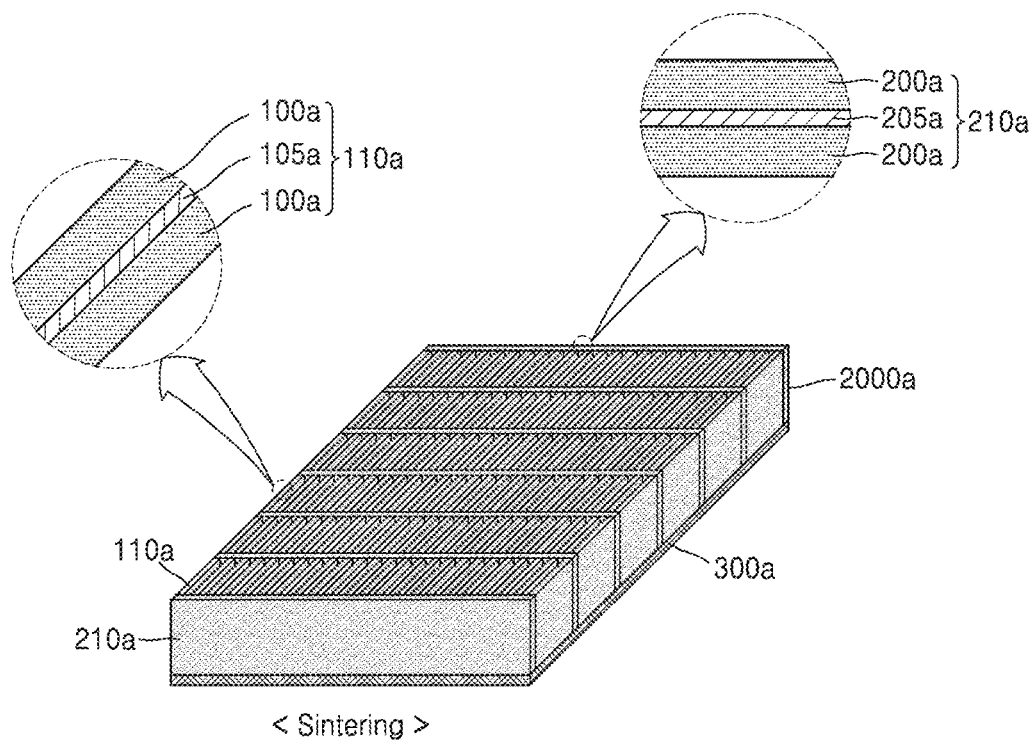

Referring to FIG. 20K, a burn-out or melt-out process may be performed on the sacrificial layer sheet 120 of FIG. 20J, and a sintering process may be performed on the divided second stacked structure 2000 and the active material-metal composition layer 300. Reference numerals 2000a and 300a respectively denote a sintered second stacked structure and a sintered active material-metal composition layer. Furthermore, reference numerals 110a and 210a respectively denote a sintered unit structure and a sintered partition wall layer. The sintered unit structure 110a may include a sintered inner current collecting layer 105a between the two sintered active material sheets 100a, and the sintered partition wall layer 210a may include a sintered partition-wall current collecting layer 205a between the two sintered partition wall sheets 200a. The sintering process may be also referred to as a co-firing process.

First, the divided second stacked structure 2000 and the active material-metal composition layer 300 may be heated to an appropriate first temperature, for example, about 500° C. or low, and maintained for an appropriate time period so that the binder material included in the divided second stacked structure 2000 and the active material-metal composition layer 300 may be removed. Then, the divided second stacked structure 2000 and the active material-metal composition layer 300 may be heated to an appropriate second temperature, for example, about 500° C. to about 800° C., and maintained for an appropriate time period so that the sacrificial layer sheet 120 of FIG. 20J may be burned out to be removed. Next, the divided second stacked structure 2000 and the active material-metal composition layer 300 may be heated to a sintering temperature of the active material included in the divided second stacked structure 2000 and the active material-metal composition layer 300, for example, about 800° C. to about 1200° C., and maintained for a predetermined time period so that the sintered second stacked structure 2000a and the sintered active material-metal composition layer 300a may be provided.

The sacrificial layer sheet 120 may be burned out or melted out according to the material of the sacrificial layer sheet 120 of FIG. 20J, and a temperature and maintenance time therefor may be modified. In an embodiment, when the sacrificial layer sheet 120 includes a carbon-based material, the sacrificial layer sheet 120 may be removed by the burn-out process, for example. When the sacrificial layer sheet 120 includes $Li_2CO_3$ or LiCl, the sacrificial layer sheet 120 may be removed by the melt-out process. In an embodiment, by directly increasing temperature to a sintering temperature of the active material without performing a process of maintaining at an intermediate temperature, the burn-out (or melt-out) process and the sintering process may be simultaneously performed.

Figure 20L:
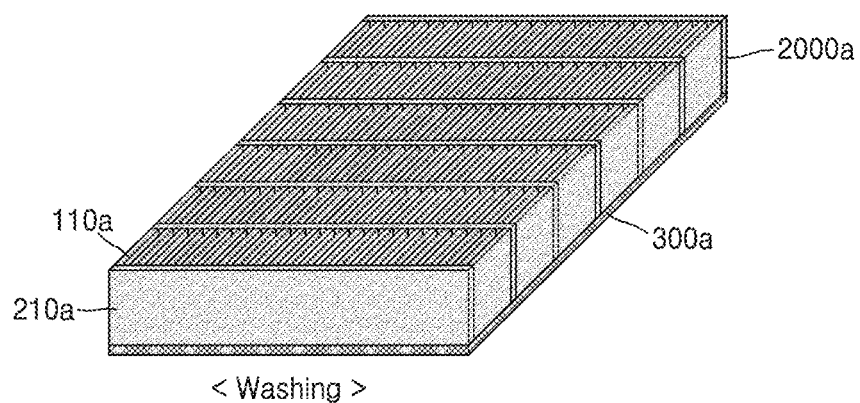

Referring to FIG. 20L, a washing process may be performed on the sintered second stacked structure 2000a and the sintered active material-metal composition layer 300a. In this regard, materials remaining after the burn-out or melt-out process, that is, residues, may be removed. In an embodiment, the washing process may be performed using, for example, water or deionized water.

Figure 20M:
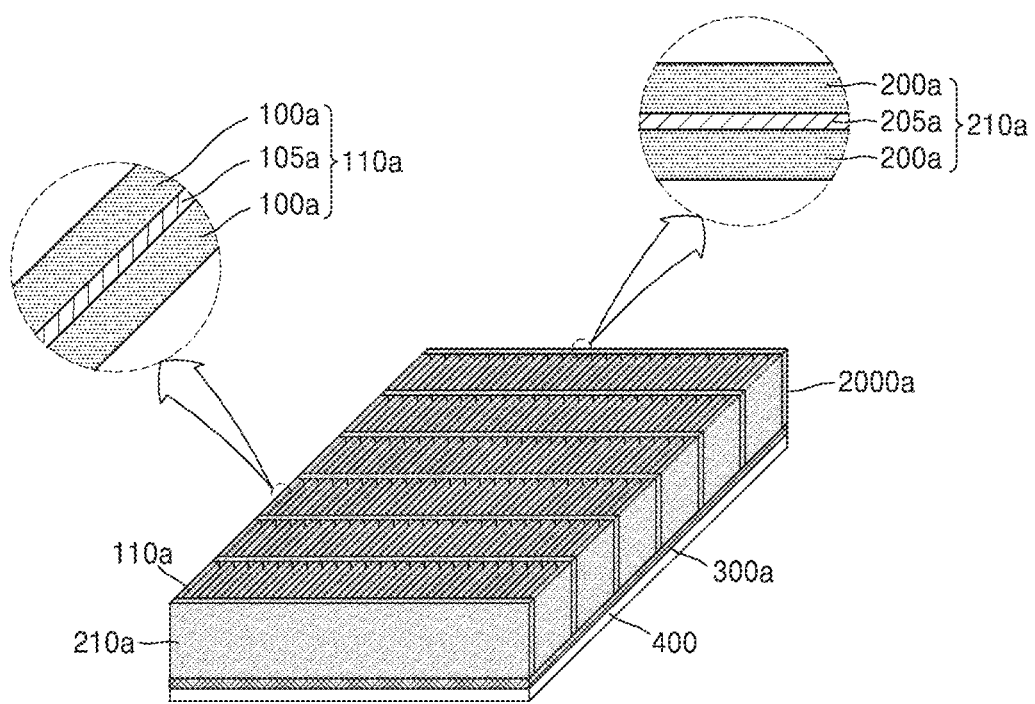

Referring to FIG. 20M, a current collecting layer 400 may be disposed on a lower surface of an active material-metal composition layer 300a. The current collecting layer 400 may be provided by depositing a conductor such as metal or by other various methods. The structure of FIG. 20M may correspond to the 3D electrode structure described with reference to FIGS. 1 and 2.

The manufacturing method described with reference to FIGS. 20A to 20M may be modified in various ways. In an embodiment, after the burn-out or melt-out and sintering processes are performed on the divided second stacked structure 2000 obtained by the process of FIG. 20I, the process of forming the active material-metal composition layer and the current collecting layer may be performed, for example. In an embodiment, the sacrificial layer sheet 120 may be removed using a predetermined etching solution. Modifications by other various methods are possible.

FIGS. 21A to 21L illustrate a method of manufacturing a 3D electrode structure according to another embodiment.

Figure 21A:
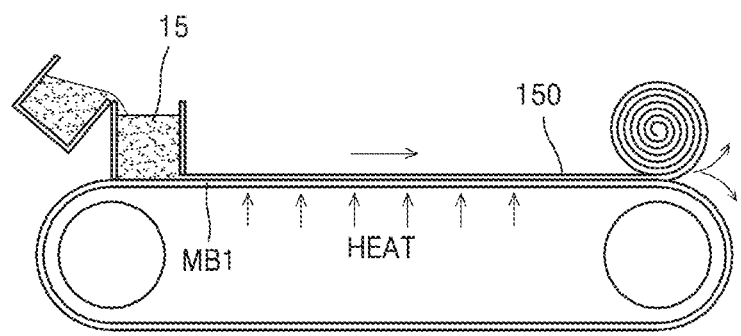
FIGS. 21A to 21L illustrate another embodiment of a method of manufacturing a 3D electrode structure.

Referring to FIG. 21A, after an active material-metal composite slurry 15 is manufactured, an active material-metal composite sheet 150 may be provided from the active material-metal composite slurry 15. In an embodiment, the active material-metal composite sheet 150 may be provided from the active material-metal composite slurry 15 using a tape-casting method, for example.

In an embodiment, the active material-metal composite slurry 15 may be manufactured by mixing, for example, an active material ingredient (powder), a metal material (powder), a binder, a dispersing agent, and a plasticizer with a solvent. In this state, a grinder or a mixing apparatus such as a ball mill may be used. In an embodiment, the active material ingredient may be a cathode active material, and the cathode active material may include a Li-containing oxide. In an embodiment, the Li-containing oxide may be an oxide including Li and transition metal. In an embodiment, the Li-containing oxide may be, for example, $LiMO_2$, where M denotes metal. In an embodiment, the M may be any one of Co, Ni, and Mn, or a combination thereof, for example. In an embodiment, the $LiMO_2$ may be $LiCoO_2$, for example. However, a detailed material of the cathode active material presented herein is exemplary and other cathode active materials may be used therefor. In an embodiment, the metal material may include at least one of, for example, Al, Cu, Ni, Co, Cr, W, Mo, Ag, Au, Pt, and Pd. In an embodiment, the active material-metal composite slurry 15 may further include a glass material. In an embodiment, the glass material may include, for example, glass frit, and the glass frit may include at least one of, for example, $BiO_x$, $SiO_x$, $CuO_x$, $PbO_x$, $ZnO_x$, and $B_xO_y$. When the glass material is included, a bonding force between the active material and the metal may be improved. Accordingly, the strength and properties of active material-metal sintered composite provided later from the active material-metal composite slurry 15 may be improved.

The active material-metal composite slurry 15 may be processed in a sheet form using a shaping apparatus such as a tape-casting apparatus. In this case, the active material-metal composite slurry 15 may be coated on the moving belt MB1 to a uniform thickness using the doctor blade (not shown). As the active material-metal composite slurry 15 coated on the moving belt MB1 is dried, that is, the solvent is evaporated, the active material-metal composite sheet 150 may be provided.

Figure 21B:
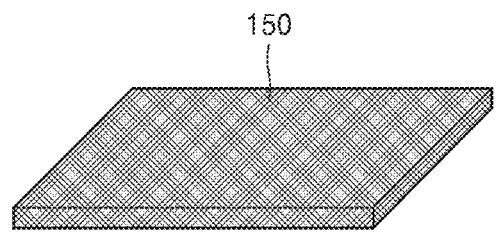

FIG. 21B illustrates the active material-metal composite sheet 150 provided by the method of FIG. 21A. In an embodiment, the active material-metal composite sheet 150 may have a thickness of, for example, about 1 μm to about 100 μm, but the invention is not limited thereto.

Figure 21C:
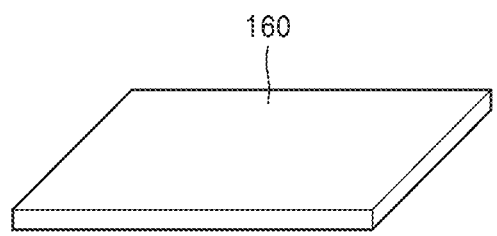

A sacrificial layer sheet 160, as illustrated in FIG. 21C, may be provided from the sacrificial layer slurry using a method similar to the method described with reference to FIGS. 21A and 21B. The sacrificial layer sheet 160 of FIG. 21C may be substantially the same as or similar to the sacrificial layer sheet 120 of FIG. 20C.

Figure 21D:
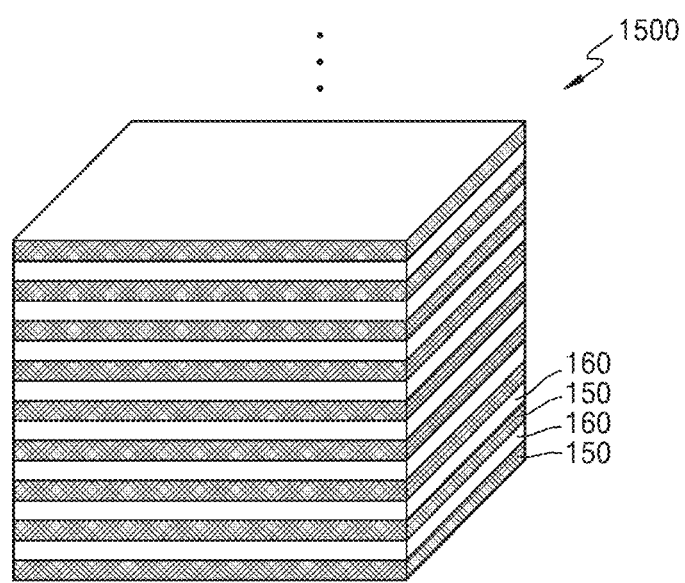

Referring to FIG. 21D, a first stacked structure 1500 may be provided by alternately stacking the active material-metal composite sheet 150 and the sacrificial layer sheet 160. Next, the first stacked structure 1500 may be pressed at a predetermined temperature with a predetermined pressure. In an embodiment, a pressing process may be performed at around the glass transition temperature Tg of a binder material included in the active material-metal composite sheet 150 in a direction parallel to the stacking direction, for example. In an embodiment, the pressing process may be, for example, the WIP process. The pressing process may be similar to the process described with reference to FIG. 20E.

Figure 21E:
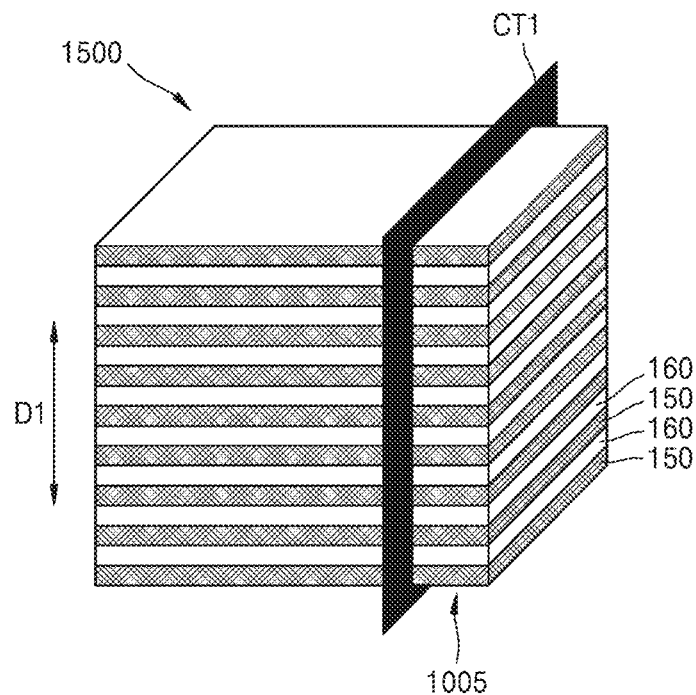

Referring to FIG. 21E, the first stacked structure 1500 may be divided into a plurality of divided first stacked structures 1005 of a desired size (e.g., thickness) using a cutting member CT1. This may be a dicing process on the first stacked structure 1500. In an embodiment, a blade cutter or wire saw may be used as the cutting member CT1.

Figure 21F:
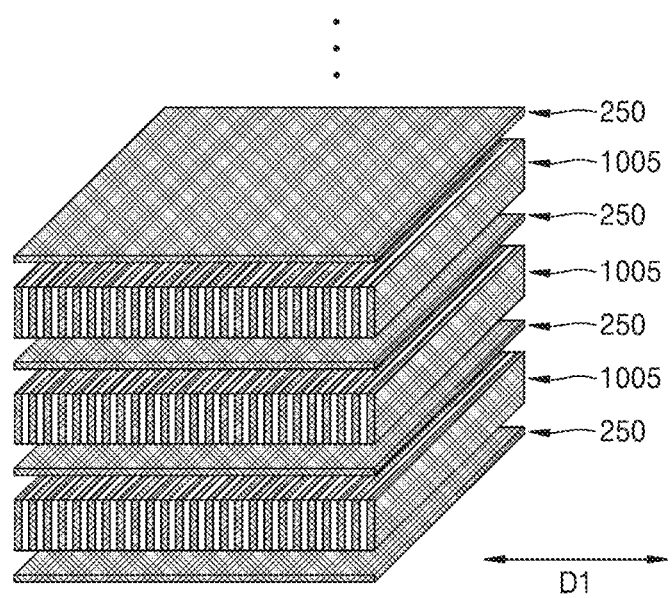

Referring to FIG. 21F, the divided first stacked structures 1005 and a plurality of partition wall sheets 250 may be alternately stacked on each other. The partition wall sheet 250 may be provided from partition wall slurry, and a formation method thereof may be similar to the method of forming the active material-metal composite sheet 150 in FIGS. 21A and 21B. The partition wall sheet 250 may include a material that is the same as or similar to that of the active material-metal composite sheet 150.

Figure 21G:
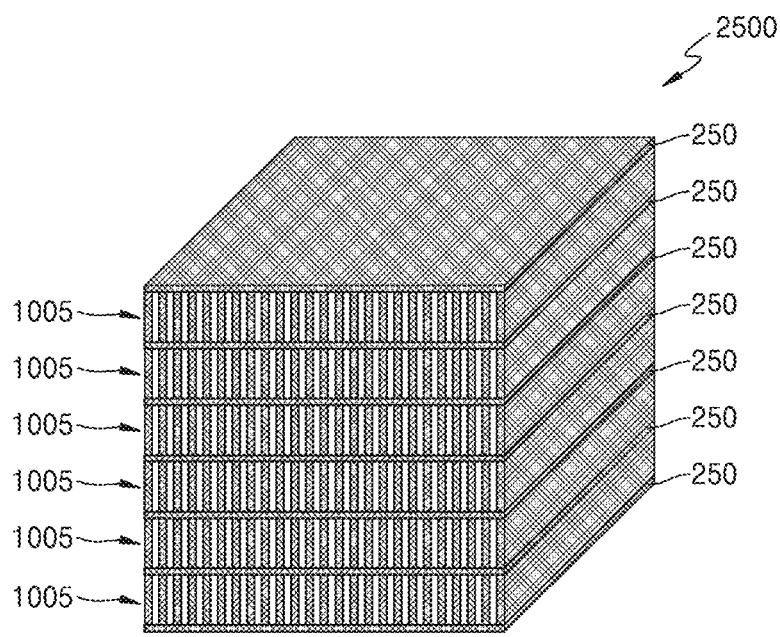

FIG. 21G illustrates a second stacked structure 2500 provided by the stacking process of FIG. 21F. The second stacked structure 2500 may be pressed at a predetermined temperature with a predetermined pressure. In an embodiment, a pressing process may be performed at around the glass transition temperature Tg of a binder material included in the partition wall sheet 250 in a direction parallel to the stacking direction (the stacking direction of FIG. 21F), for example. In an embodiment, the pressing process may be, for example, the WIP process. The pressing process may be similar to the process described with reference to FIG. 20H.

Figure 21H:
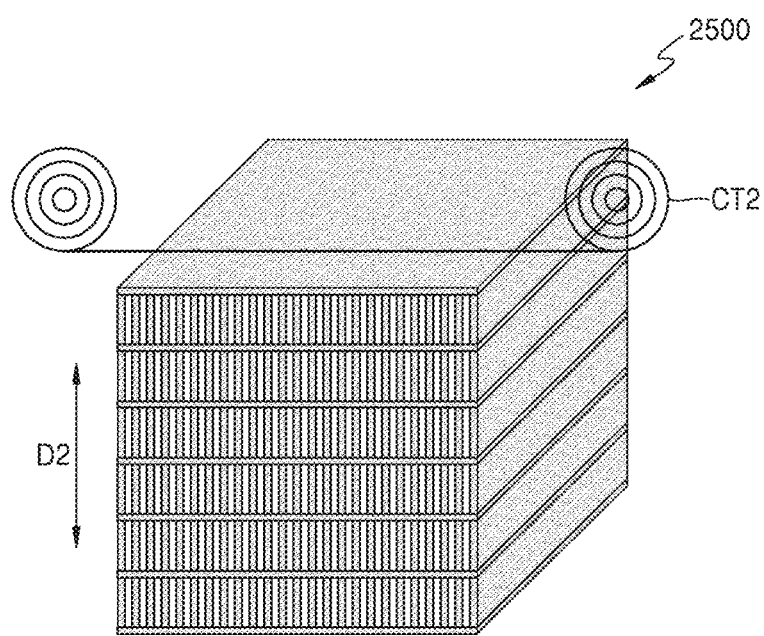
Figure 21I:
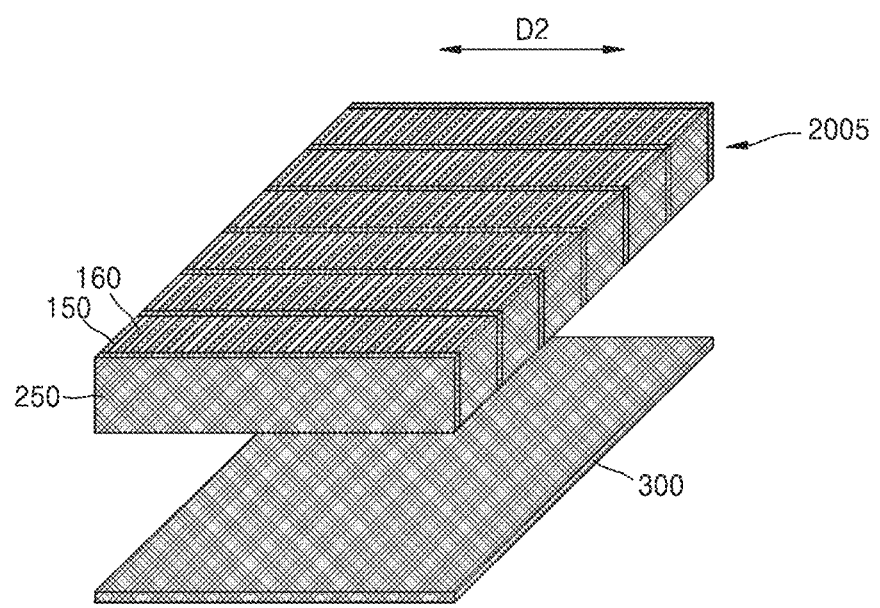

Referring to FIG. 21H, the second stacked structure 2500 may be divided into a plurality of divided second stacked structures 2005 of FIG. 21I of a desired size (e.g., thickness) using a cutting member CT2. This may be a dicing process on the second stacked structure 2500. In an embodiment, a blade cutter or wire saw may be used as the cutting member CT2.

Referring to FIG. 21I, an active material-metal composition layer 300 may be disposed on a surface of the divided second stacked structure 2005. The active material-metal composition layer 300 may be the same as or similar to the active material-metal composition layer 300 of FIG. 20J.

Figure 21J:
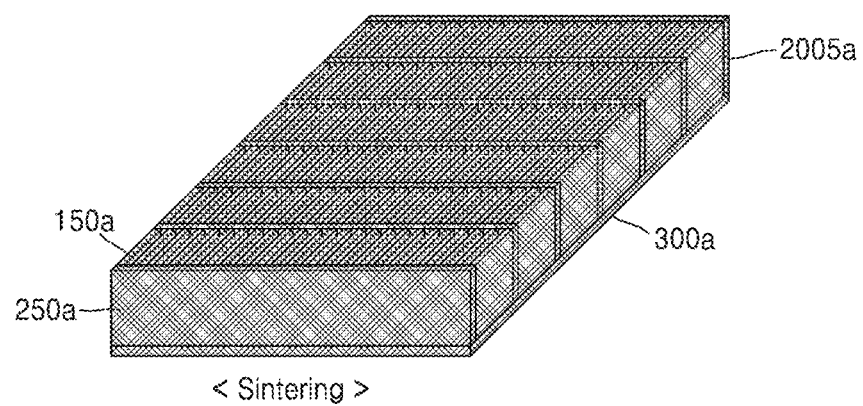

Referring to FIG. 21J, a burn-out or melt-out process may be performed on the sacrificial layer sheet 160 of FIG. 21I, and a sintering process may be performed on the divided second stacked structure 200S and the active material-metal composition layer 300. Reference numerals 200Sa and 300a respectively denote a sintered second stacked structure and a sintered active material-metal composition layer. Furthermore, reference numerals 150a and 250a respectively denote a sintered active material-metal composite sheet and a sintered partition wall sheet. The sintering process may be referred to as a co-firing process. The burn-out or melt-out and sintering processes may be similar to the processes described with reference to FIG. 20K.

Figure 21K:
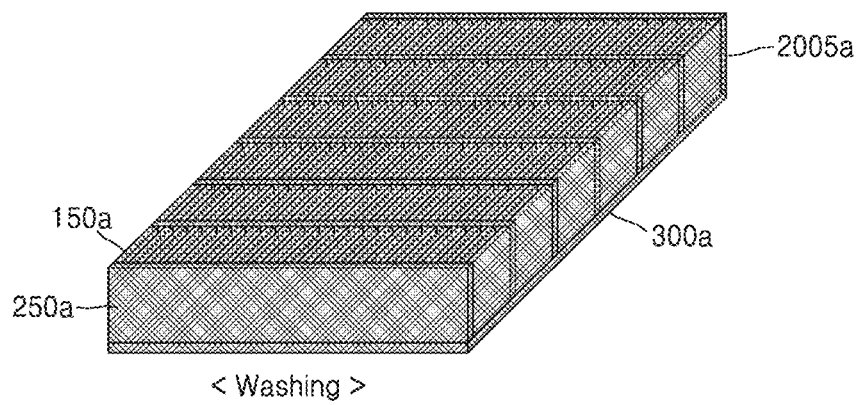

Referring to FIG. 21K, a washing process may be performed on the sintered second stacked structure 200Sa and the sintered active material-metal composition layer 300a. In this regard, materials remaining after the burn-out or melt-out process, that is, residues, may be removed. In an embodiment, the washing process may be performed using, for example, water or deionized water.

Figure 21L:
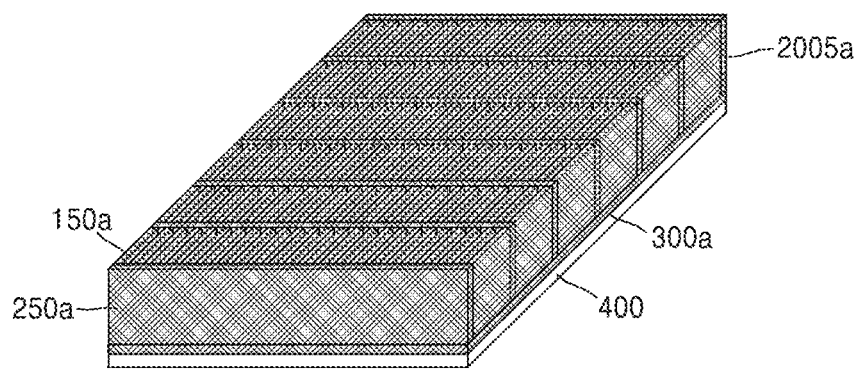

Referring to FIG. 21L, the current collecting layer 400 may be disposed on a lower surface of the active material-metal composition layer 300a. The structure of FIG. 21L may correspond to the 3D electrode structure described with reference to FIG. 9.

The manufacturing method described with reference to FIGS. 21A to 21L may be modified in various ways. In an embodiment, after the burn-out or melt-out and sintering processes are performed on the divided second stacked structures 200S obtained by the process of FIG. 21H, the process of forming the active material-metal composition layer and the current collecting layer may be performed, for example. In an embodiment, the sacrificial layer sheet 160 may be removed using a predetermined etching solution. Modifications by other various methods are possible.

Furthermore, by modifying the method of FIGS. 20A to 20M or the method of FIGS. 21A to 21L, the electrode structure described with reference to FIG. 10 to FIG. 13, and various electrode structures modified therefrom, may be manufactured.

Figure 22:
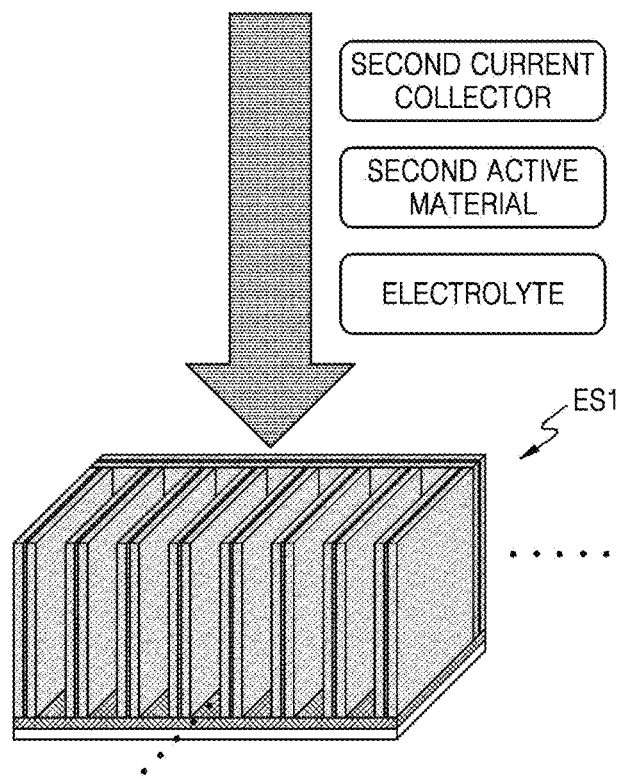
FIG. 22 illustrates an embodiment of a method of manufacturing a secondary battery including a 3D electrode structure.

FIG. 22 illustrates a method of manufacturing a secondary battery including a 3D electrode structure according to an embodiment.

Referring to FIG. 22, a secondary battery may be manufactured by sequentially forming an electrolyte layer, a second active material member, and a second current collecting layer on a manufactured 3D electrode structure ES1. The 3D electrode structure ES1 may have a variety of structures corresponding to the electrode structures described with reference to FIGS. 1 to 4 and FIGS. 9 to 13 or modified structures therefrom. The manufactured secondary battery may have a structure described in FIGS. 14 to 19 or a variety of structures modified therefrom. In an embodiment, the second active material member and the second current collecting layer may be provided in a single unitary element. In other words, a portion of the second active material member may be used as a current collector. In this case, a separate second current collecting layer may not be provided.

Figure 23:
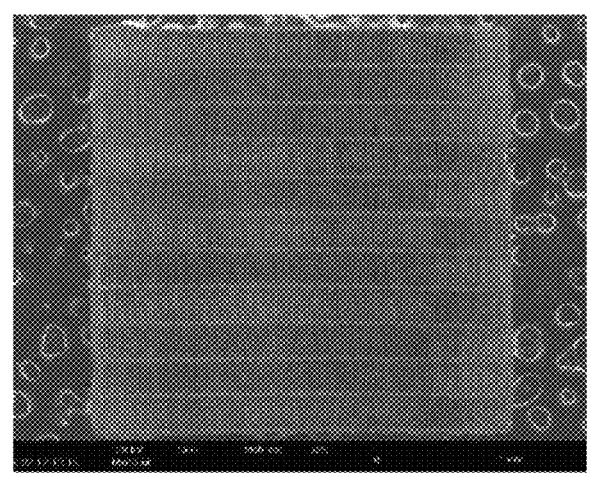
FIG. 23 is a SEM image showing an embodiment of a 3D electrode structure.

FIG. 23 is a SEM image showing a 3D electrode structure provided according to an embodiment. In FIG. 23, the 3D electrode structure is viewed from the top thereof, from which the structures of a plurality of active material plates and partition walls may be identified. In FIG. 23, the dimensions and structures of elements of the 3D electrode structure are exemplary and may be changed.

Figure 24:
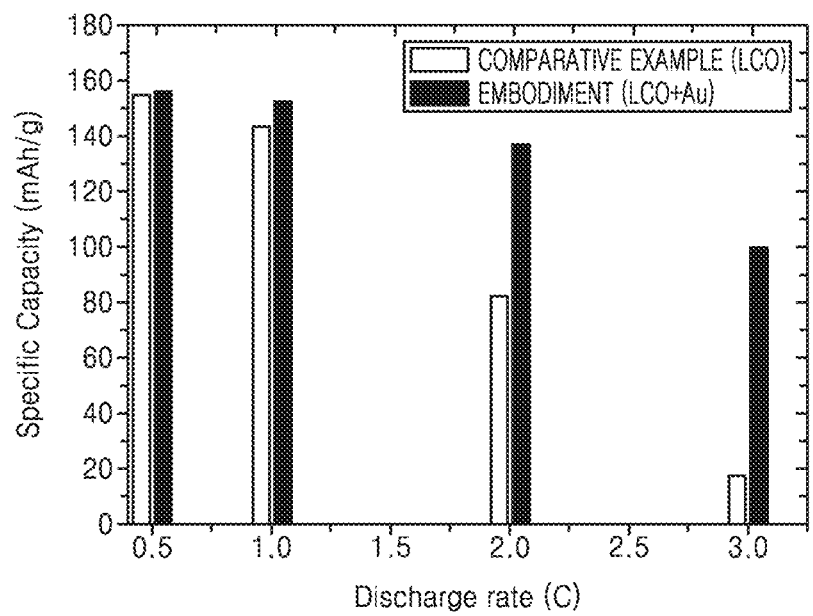
FIG. 24 is a graph showing a result of measurement of a change in specific capacity according to a discharge rate (C rate) of a secondary battery including a comparative example of an electrode structure and a secondary battery including an embodiment of an electrode structure.

FIG. 24 is a graph showing a result of measurement of a change in specific capacity in terms of milliampere-hour per gram (mAh/g) according to a discharge rate (C rate) of a secondary battery including an electrode structure according to a comparative example and a secondary battery including an electrode structure according to the embodiment. The electrode structure according to the comparative example is a cathode structure including a lithium cobalt oxide ("LCO") sintered body, and the electrode structure according to the illustrated embodiment is a cathode structure including a sintered composite including LCO and Au (5 vol %). The result of FIG. 24 is according to a case of using an electrode structure of a 2D structure (the comparative example and the embodiment).

Referring to FIG. 24, it may be seen that, when the electrode structure according to the embodiment is used, specific capacity is improved, compared to a case of using an electrode structure according to the comparative example. Although a difference in the specific capacity is relatively small for a low rate discharge, a difference in the specific capacity is substantially large for a rate discharge equal to or greater than 1C. Accordingly, when an electrode structure according to the illustrated embodiment is used, high rate discharge capacity may be much improved.

Figure 25:
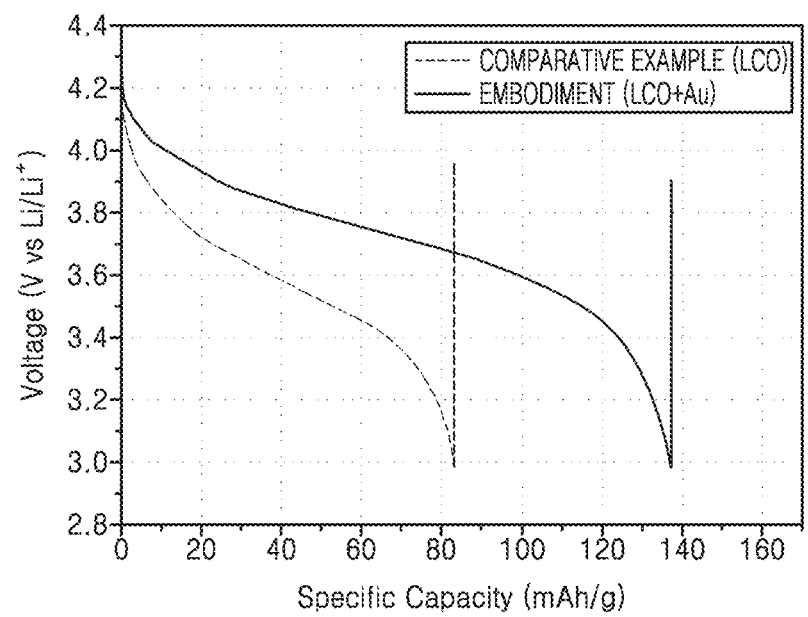
FIG. 25 is a discharge graph of a secondary battery including a comparative example of an electrode structure and a secondary battery including an embodiment of an electrode structure.

FIG. 25 is a discharge graph of a secondary battery including an electrode structure according to a comparative example and a secondary battery including an electrode structure according to an embodiment. The electrode structure according to the comparative example and the electrode structure according to the illustrated embodiment are the same as those described in FIG. 24. The specific capacity-voltage properties are evaluated while the secondary batteries are discharged at a 2C rate. The result of FIG. 25 is based on a case of using a 2D electrode structure (the comparative example and the embodiment). In the discharge graph, the capacity is in terms of mAh/g and the voltage is be in terms of voltage versus $Li/Li^+$ (V vs $Li/Li^+$).

Referring to FIG. 25, it may be seen that a graph of the secondary battery employing an electrode structure according to the illustrated embodiment is located substantially far to the right side of the graph of the secondary battery employing the electrode structure according to the comparative example. This means that a discharge capacity of the second battery employing an electrode structure according to the illustrated embodiment is much improved compared to a discharge capacity of the secondary battery employing an electrode structure according to the comparative example.

It may be seen from the results of FIGS. 24 and 25 that the performance of a secondary battery may be much improved when the 3D electrode structure according to the illustrated embodiment is applied to a secondary battery, the performance of the secondary battery may be much improved. In this case, much superior performance may be obtained to the results of FIG. 24 and FIG. 25 assuming a 2D structure.

A secondary battery including the 3D electrode structures according to the above-described various embodiments may be applied to various electronic apparatuses. The electronic apparatus may include mobile devices and wearable devices. In an embodiment, the mobile device may include, for example, mobile phones or smartphones, and the wearable device may include, for example, smart watches or smart bands. However, the application fields of the secondary battery are not limited to the mobile phone or smart watch and may be modified diversely. Furthermore, the secondary battery may be applied to various electronic apparatuses, not to the mobile devices or wearable devices. The secondary battery may be applied to all fields to which existing secondary batteries have been applied. Since the 3D electrode structure according to the illustrated embodiment has high energy density, superior rate capability, and durability/stability, an electronic apparatus having superior power performance may be implemented using the 3D electrode structure.

Although in the above description many features are discussed in detail, they should be interpreted to be examples of detailed embodiments not limiting the scope of the invention. In an embodiment, one of ordinary skill in the art would see that the structures of 3D electrode structure described with reference to FIGS. 1 to 4 and FIGS. 9 to 13 and the secondary battery described with reference to FIGS. 14 to 19 may be modified in various ways, for example. In a detailed example, in the structures of FIGS. 1, 2, and 9 to 13, the active material base layer AB10 may not be provided, the formation direction of the active material plates AP10 with respect to the current collecting layer CL10 and the formation direction of the partition wall WL10 with respect to the current collecting layer CL10 and the active material plates AP10 may be modified in various ways, and the shapes of the active material plates AP10 and the partition wall WL10 may be modified in various ways. Furthermore, it may be seen that the method of manufacturing a 3D electrode structure described with reference to FIGS. 20A to 20M, the method of manufacturing a 3D electrode structure described with reference to FIGS. 21A to 21L, and the method of manufacturing a secondary battery employing the 3D structures may be modified in various ways. In addition, the application fields of the 3D electrode structures according to the embodiments may be modified in various ways. Thus, the scope of the invention should be determined not by the above-described embodiments, but by the technical concepts defined in the following claims.

It should be understood that embodiments described herein should be considered in a descriptive sense only and not for purposes of limitation. Descriptions of features within each embodiment should typically be considered as available for other similar features in other embodiments.

While one or more embodiments have been described with reference to the drawings, it will be understood by those of ordinary skill in the art that various changes in form and details may be made therein without departing from the spirit and scope as defined by the following claims.

What is claimed is:

1. A three-dimensional electrode structure comprising:
   a current collecting layer;
   a plurality of plates electrically connected to the current collecting layer, protruding from the current collecting layer, and comprising an active material; and
   a base layer provided between the current collecting layer and the plurality of plates, the base layer comprising an active material-metal sintered composite,
   wherein a content of metal in the active material-metal sintered composite is about 1 vol % to about 30 vol %.

2. The three-dimensional electrode structure of claim 1, wherein the active material-metal sintered composite comprises at least one metal of Al, Cu, Ni, Co, Cr, W, Mo, Ag, Au, Pt, and Pd.

3. The three-dimensional electrode structure of claim 1, wherein the active material-metal sintered composite comprises a cathode active material.

4. The three-dimensional electrode structure of claim 1, wherein the active material-metal sintered composite comprises a plurality of active material grains and a plurality of metal grains, and an average size of the plurality of metal grains is less than an average size of the plurality of active material grains.

5. The three-dimensional electrode structure of claim 1, wherein each of the plurality of plates comprises an inner current collecting layer inside thereof, and the inner current collecting layer electrically contacts the base layer.

6. The three-dimensional electrode structure of claim 1, wherein the plurality of plates comprises an active material-metal sintered composite.

7. The three-dimensional electrode structure of claim 6, wherein a metal content (vol %) of the active material-metal sintered composite of the plurality of plates is less than a metal content (vol %) of the active material-metal sintered composite of the base layer.

8. The three-dimensional electrode structure of claim 6, wherein a metal content of the active material-metal sintered composite of the plurality of plates is about 1 vol % to about 20 vol %.

9. The three-dimensional electrode structure of claim 6, wherein an electrical conductivity of the active material-metal sintered composite of the base layer is higher than an electrical conductivity of the active material-metal sintered composite of the plurality of plates.

10. The three-dimensional electrode structure of claim 1, further comprising:
    at least one partition wall arranged on the base layer perpendicular to the plurality of plates and supporting the plurality of plates.

11. The three-dimensional electrode structure of claim 10, wherein the at least one partition wall comprises an active material of a same composition as or a different composition from the plurality of plates.

12. The three-dimensional electrode structure of claim 10, wherein the at least one partition wall comprises an inner current collecting layer inside thereof, and the inner current collecting layer electrically contacts the base layer.

13. The three-dimensional electrode structure of claim 10, wherein the at least one partition wall comprises an active material-metal sintered composite.

14. The three-dimensional electrode structure of claim 13, wherein a metal content (vol %) of the active material-metal sintered composite of the at least one partition wall is less than a metal content (vol %) of the active material-metal sintered composite of the base layer.

15. A secondary battery comprising:
    a first electrode structure comprising the three-dimensional electrode structure defined in claim 1;
    a second electrode structure arranged spaced apart from the first electrode structure; and
    an electrolyte provided between the first electrode structure and the second electrode structure.

16. The second battery of claim 15, wherein the first electrode structure is a cathode structure and the second electrode structure is an anode structure.

17. The second battery of claim 15, wherein:
    the first electrode structure comprises a plurality of first plates having a first active material and the second electrode structure comprises a plurality of second plates having a second active material, and
    the plurality of first plates and the plurality of second plates are alternately arranged.

18. The second battery of claim 15, wherein the first electrode structure, the electrolyte, and the second electrode structure constitute a battery cell, and a plurality of battery cells corresponding to the battery cell are stacked on each other.

19. A three-dimensional electrode structure comprising:
a current collecting layer; and
a plurality of plates electrically connected to the current collecting layer, arranged perpendicular to the current collecting layer, and comprising an active material and an active material-metal sintered composite,
wherein a content of metal in the active material-metal sintered composite is about 1 vol % to about 20 vol %.

20. The three-dimensional electrode structure of claim 19, wherein the active material-metal sintered composite comprises at least one metal of Al, Cu, Ni, Co, Cr, W, Mo, Ag, Au, Pt, and Pd.

21. A three-dimensional electrode structure comprising:
a current collecting layer;
a plurality of plates electrically connected to the current collecting layer, protruding from the current collecting layer, and comprising an active material; and
a base layer provided between the current collecting layer and the plurality of plates, the base layer comprising an active material-metal sintered composite,
wherein the active material-metal sintered composite comprises a plurality of active material grains and a plurality of metal grains, and an average size of the plurality of metal grains is less than an average size of the plurality of active material grains.

22. A three-dimensional electrode structure comprising:
a current collecting layer;
a plurality of plates electrically connected to the current collecting layer, protruding from the current collecting layer, and comprising an active material; and
a base layer provided between the current collecting layer and the plurality of plates, the base layer comprising an active material-metal sintered composite,
wherein a metal content (vol %) of the active material-metal sintered composite of the plurality of plates is less than a metal content (vol %) of the active material-metal sintered composite of the base layer.

* * * * *